United States Patent
Kawamura

(10) Patent No.: US 10,416,410 B2
(45) Date of Patent: Sep. 17, 2019

(54) IMAGING LENS AND IMAGING APPARATUS

(71) Applicant: FUJIFILM Corporation, Tokyo (JP)

(72) Inventor: Daiki Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 15/612,371

(22) Filed: Jun. 2, 2017

(65) Prior Publication Data
US 2017/0351051 A1   Dec. 7, 2017

(30) Foreign Application Priority Data
Jun. 6, 2016   (JP) .................. 2016-112436

(51) Int. Cl.
G02B 7/04 (2006.01)
G02B 9/64 (2006.01)
G02B 13/18 (2006.01)
G02B 9/60 (2006.01)

(52) U.S. Cl.
CPC .................. *G02B 7/04* (2013.01); *G02B 9/60* (2013.01); *G02B 9/64* (2013.01); *G02B 13/18* (2013.01)

(58) Field of Classification Search
CPC . G02B 13/18; G02B 7/04; G02B 9/60; G02B 9/64
See application file for complete search history.

(56) References Cited

U.S. PATENT DOCUMENTS

| 6,124,984 A * | 9/2000 | Shibayama | ........ G02B 15/177 359/689 |
| 2012/0194924 A1 | 8/2012 | Sakai et al. | |
| 2012/0229921 A1 * | 9/2012 | Eguchi | ........ G02B 15/163 359/771 |
| 2012/0257100 A1 | 10/2012 | Imaoka et al. | |
| 2012/0293879 A1 | 11/2012 | Hayashi et al. | |
| 2013/0033768 A1 | 2/2013 | Sunaga et al. | |

FOREIGN PATENT DOCUMENTS

| JP | 2012-159613 A | 8/2012 |
| JP | 2012-226309 A | 11/2012 |
| JP | 2012-242472 A | 12/2012 |
| JP | 2012-242689 A | 12/2012 |
| JP | 2013-037080 A | 2/2013 |
| JP | 2014-21341 A | 2/2014 |

OTHER PUBLICATIONS

An Office Action; "Notice of Reasons for Refusal," issued by the Japanese Patent Office dated May 28, 2019, which corresponds to Japanese Patent Application No. 2016-112436 and is related to U.S. Appl. No. 15/612,371; with English Translation.

* cited by examiner

*Primary Examiner* — Joseph P Martinez
*Assistant Examiner* — Vipin Patel
(74) *Attorney, Agent, or Firm* — Studebaker & Brackett PC

(57) ABSTRACT

The imaging lens consists of, in order from the object side, a first lens group having a positive power, a second lens group having a negative power, and a third lens group. The first lens group consists of, in order from the object side, a positive front group, a diaphragm, and a positive rear group. The front group has a negative lens and a positive lens, the rear group has a negative lens and a positive lens, the second lens group consists of one negative lens, and the third lens group has a negative lens and a positive lens. During focusing, only the second lens group moves. The following conditional expression relating to a focal length of the second lens group and a focal length of the third lens group is satisfied: $2.5<|f3/f2|$.

20 Claims, 14 Drawing Sheets

EXAMPLE 1

EXAMPLE 1

EXAMPLE 2

EXAMPLE 3

EXAMPLE 4

EXAMPLE 5

EXAMPLE 6

FIG. 7
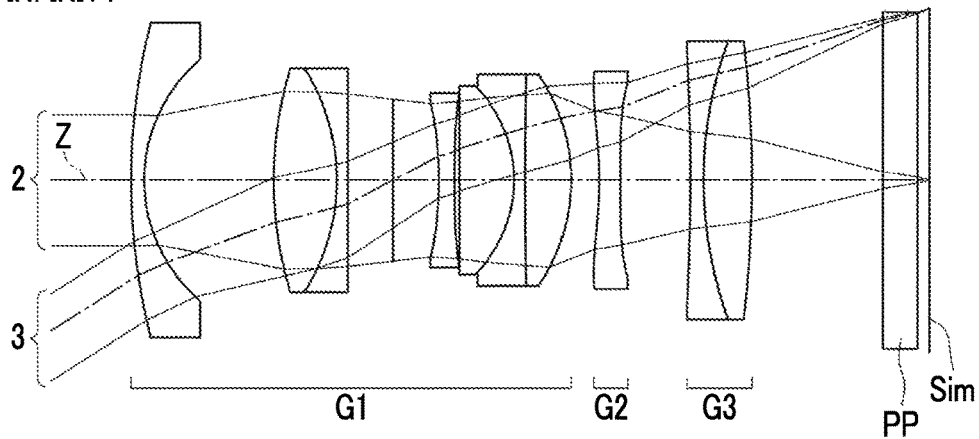
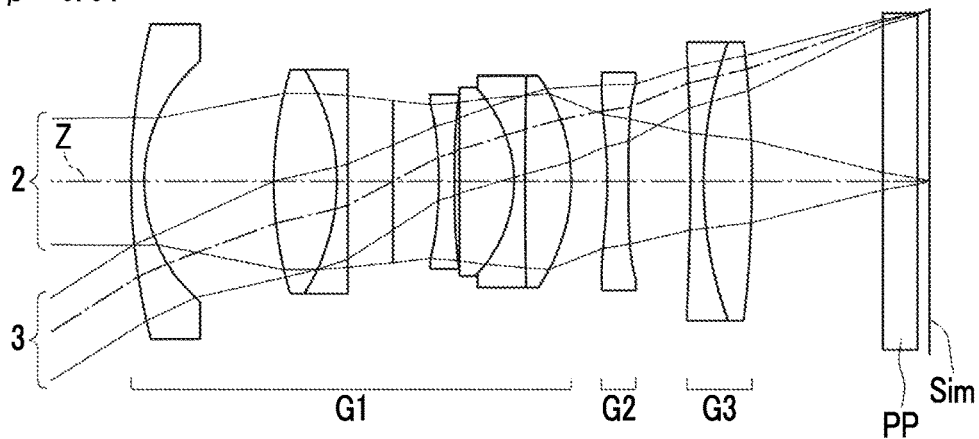

EXAMPLE 1

EXAMPLE 3

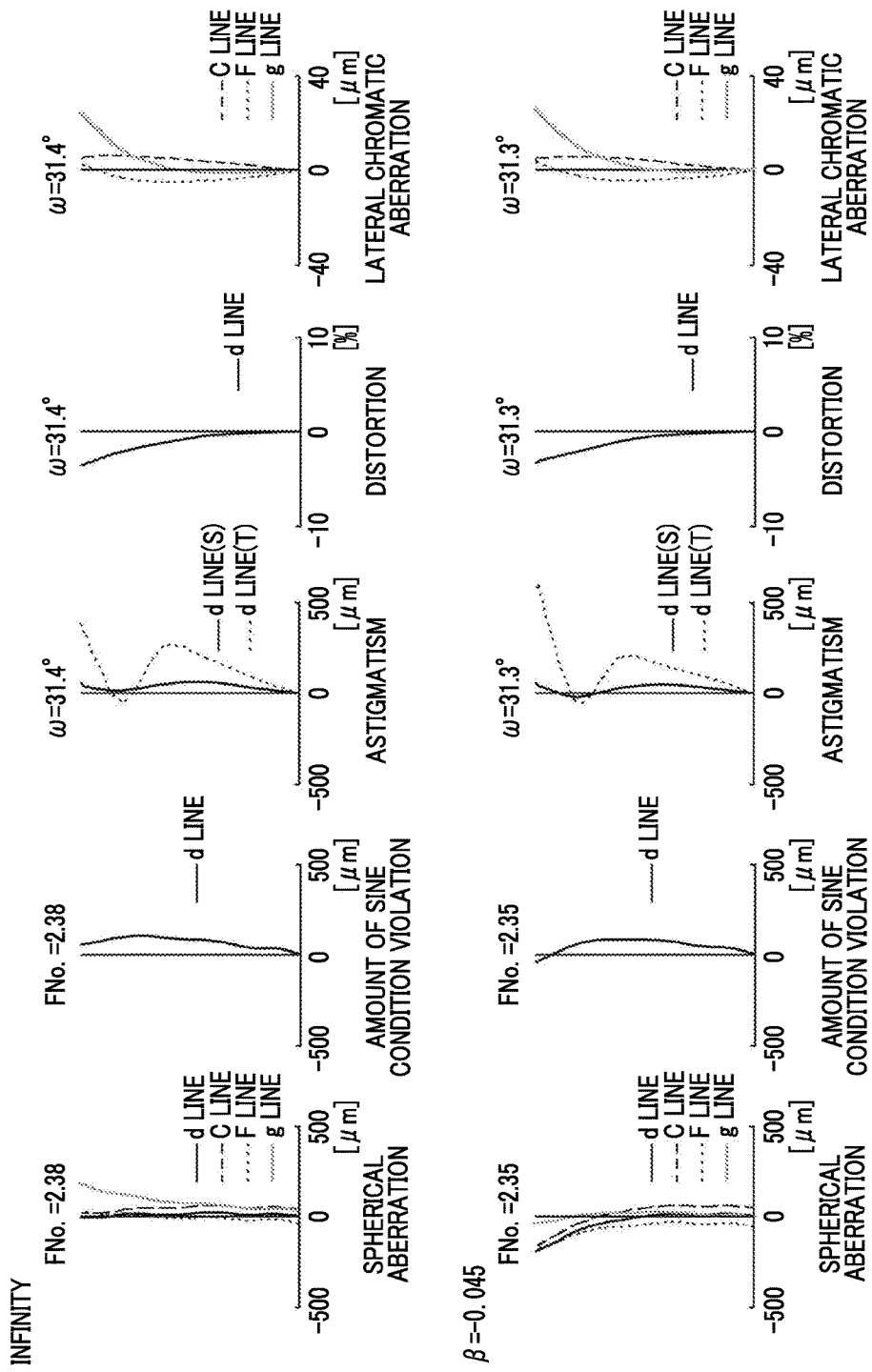

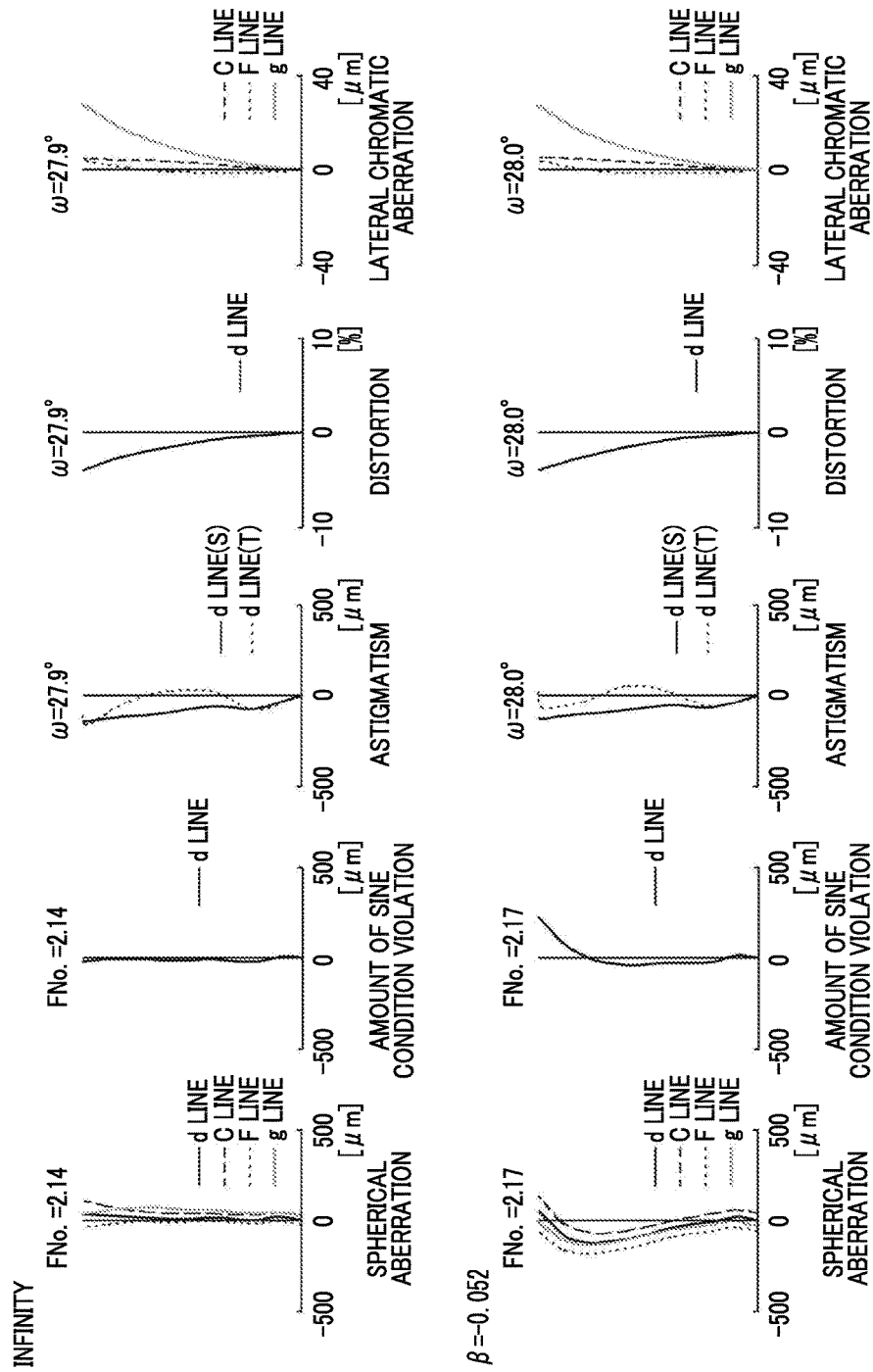

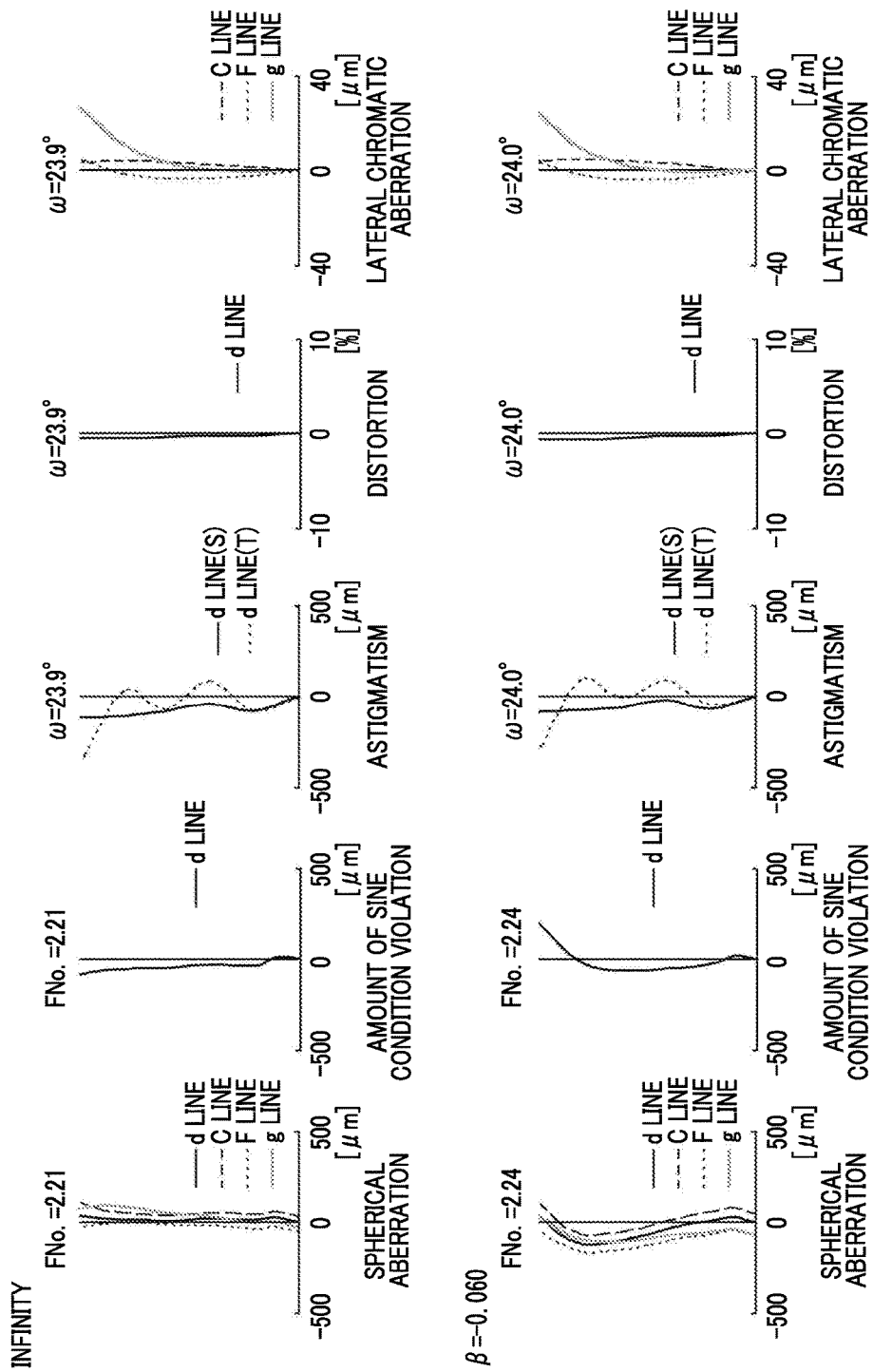

IMAGING LENS AND IMAGING APPARATUS

CROSS-REFERENCE TO RELATED APPLICATIONS

The present application claims priority under 35 U.S.C. § 119 to Japanese Patent Application No. 2016-112436, filed on Jun. 6, 2016. The above application is hereby expressly incorporated by reference, in its entirety, into the present application.

BACKGROUND OF THE INVENTION

1. Field of the Invention

The present invention relates to an imaging lens, which is appropriate for a digital camera, a video camera, and/or the like, and an imaging apparatus which comprises the imaging lens.

2. Description of the Related Art

In recent years, an inner focusing system is used in an imaging lens used in an imaging apparatus such as a digital camera. For example, the following JP2012-159613A, JP2012-226309A, JP2012-242472A, JP2013-37080A, and JP2012-242689A each disclose an imaging lens that has a three-group configuration of a first lens group, a second lens group, and a third lens group and performs focusing by moving the second lens group with respect to the image plane in a state where the first lens group and the third lens group remain stationary with respect to the image plane.

In order to increase a speed of auto focusing in the imaging lens of the inner focusing system and reduce a load to a focus driving system, it is preferable to make the lens group (hereinafter referred to as a focus lens group), which moves during focusing, more lightweight. JP2012-159613A, JP2012-226309A, JP2012-242472A, JP2013-37080A, and JP2012-242689A each disclose an imaging lens in which the focus lens group is formed of only one lens.

SUMMARY OF THE INVENTION

It is necessary to form the focus lens group with a small number of lenses. Further, in order to suppress fluctuation in aberrations caused by movement of the focus lens group, it is necessary to optimize not only the configuration of the focus lens group but also the configuration of the lens groups disposed on the object side and the image side thereof.

In the imaging lens according to JP2012-159613A, JP2012-226309A, JP2012-242472A, and JP2013-37080A, the third lens group, which is disposed to be closer to the image side than the focus lens group, is formed of only one positive lens. In such a configuration, it is difficult to suppress fluctuation in off-axis rays during focusing. Further, in a case where the third lens group is formed of only the positive lens, it is difficult to suppress fluctuation in chromatic aberration during focusing.

In the imaging lens described in JP2012-242689A, the third lens group is formed of two lenses including a positive lens and a negative lens. However, a refractive power of the third lens group is set to be strong, and thus fluctuation in off-axis rays during focusing becomes large.

The present invention has been made in consideration of the above-mentioned situation, and its object is to provide an imaging lens that is capable of high-speed focusing and capable of suppressing fluctuation in aberrations during focusing so as to have favorable optical performance, and an imaging apparatus comprising the imaging lens.

An imaging lens of the present invention consists of, in order from an object side: a first lens group that has a positive refractive power; a second lens group that has a negative refractive power; and a third lens group that has a positive or negative refractive power. The first lens group consists of, in order from the object side, a front group having a positive refractive power, a diaphragm, and a rear group having a positive refractive power. The front group has at least one negative lens and at least one positive lens. The rear group has at least one negative lens and at least one positive lens. The second lens group consists of one negative lens. The third lens group has at least one negative lens and at least one positive lens. During focusing from an object at infinity to a close-range object, the first lens group and the third lens group remain stationary with respect to an image plane, and the second lens group moves from the object side to an image side. The following conditional expression (1) is satisfied.

$$2.5 < |f3/f2| \tag{1}$$

Here, f3 is a focal length of the third lens group, and f2 is a focal length of the second lens group.

It is preferable that the imaging lens of the present invention satisfies the following conditional expression (2).

$$0.4 < f1/f < 1.2 \tag{2}$$

Here, f1 is a focal length of the first lens group, and f is a focal length of the whole system in a state where the object at infinity is in focus.

It is preferable that the imaging lens of the present invention satisfies the following conditional expressions (3) and (4).

$$1.68 < NdG2 \tag{3}$$

$$30 < vdG2 < 60 \tag{4}$$

Here, NdG2 is a refractive index of the negative lens of the second lens group at a d line, and vdG2 is an Abbe number of the negative lens of the second lens group at the d line.

It is preferable that the imaging lens of the present invention satisfies at least one of the following conditional expressions (5) to (10).

$$1.5 < |f23/f1| < 5.4 \tag{5}$$

$$0.8 < |f2/f| < 3.0 \tag{6}$$

$$0.6 < |(1-\beta 2^2) \times \beta 3^2| < 2.3 \tag{7}$$

$$1.0 < \beta 2/\beta 3 < 2.6 \tag{8}$$

$$3.0 < |f3/f| \tag{9}$$

$$0.2 < Ds/TL < 0.5 \tag{10}$$

Here, f23 is a combined focal length of the second lens group and the third lens group in a state where the object at infinity is in focus,
f1 is a focal length of the first lens group,
f2 is a focal length of the second lens group,
f is a focal length of the whole system in a state where the object at infinity is in focus,
β2 is a lateral magnification of the second lens group in a state where the object at infinity is in focus, β3 is a lateral magnification of the third lens group in a state where the object at infinity is in focus, β3 is a focal length of the third lens group, Ds is a distance from a lens surface closest to the object side to the diaphragm on the optical axis, and TL is a sum of a back focus as an air conversion distance and a distance on the optical axis from the lens surface closest to the object side to a lens surface closest to the image side.

In the imaging lens of the present invention, it is preferable that a negative lens is disposed to be closest to the object side of the front group. Further, it is preferable that the front group consists of a negative lens, which is disposed to be closest to the object side, and a partial lens group which is disposed to be separated by an air gap from the negative lens and has a positive refractive power. The front group may consist of a negative lens, which is disposed to be closest to the object side, and a cemented lens which is disposed to be separated by an air gap from the negative lens and is formed by cementing one positive lens and one negative lens.

In the imaging lens of the present invention, it is preferable that the rear group has at least two negative lenses and at least two positive lenses. The rear group may have, in order from the object side, one negative lens and three cemented lenses. In addition, the three cemented lenses may be formed by cementing two positive lenses and one negative lens. At that time, the rear group may consist of, in order from the object side, one negative lens and three cemented lenses. In addition, the three cemented lenses may be formed by cementing a positive lens, a negative lens, and a positive lens, in order from the object side.

In the imaging lens of the present invention, it is preferable that the third lens group consists of one negative lens and one positive lens. At that time, it is preferable that the third lens group consists of, in order from the object side, one negative lens and one positive lens. Further, in the imaging lens of the present invention, the third lens group may be formed to have a positive refractive power.

An imaging apparatus of the present invention comprises the imaging lens of the present invention.

It should be noted that the term "consist(s) of" means that the imaging lens may include not only the above-mentioned elements but also lenses substantially having no powers, optical elements, which are not lenses, such as a diaphragm and a cover glass, and mechanism parts such as a lens flange, a lens barrel, an imaging element, and a hand shaking correction mechanism.

In addition, the term "~group that has a positive refractive power" means that the group has a positive refractive power as a whole. It is the same for the term "~group that has a negative refractive power". Reference signs of refractive powers of the lens groups and reference signs of refractive powers of the lenses are assumed as those in paraxial regions in a case where some lenses have aspheric surfaces. The "group" is not necessarily formed of a plurality of lenses, but may be formed as only one lens.

In addition, the term "has, in order from the object side, ~" is defined to include all configurations each having elements continuously and discontinuously arranged in order. In addition, the number of lenses mentioned above is the number of lenses formed as the elements. For example, the number of lenses of the cemented lens, in which a plurality of single lenses having different materials is cemented, indicates the number of single lenses constituting the cemented lens. Further, all the conditional expressions are based on the d line (a wavelength of 587.6 nm).

According to the present invention, the imaging lens includes, in order from the object side, a first lens group having a positive power, a second lens group having a negative power, and a third lens group. In a lens system in which only the second lens group moves during focusing, a configuration of each lens group is appropriately set such that predetermined conditional expressions are further satisfied. Therefore, it is possible to provide an imaging lens of an inner focusing system that is capable of high-speed focusing and capable of suppressing fluctuation in aberrations during focusing so as to have favorable optical performance, and an imaging apparatus having the imaging lens.

BRIEF DESCRIPTION OF THE DRAWINGS

FIG. 7 is an optical path diagram of the imaging lens shown in FIG. 1.

FIG. 11 is a diagram of aberrations of the imaging lens of Example 4 of the present invention.

FIG. 12 is a diagram of aberrations of the imaging lens of Example 5 of the present invention.

FIG. 13 is a diagram of aberrations of the imaging lens of Example 6 of the present invention.

DESCRIPTION OF THE PREFERRED EMBODIMENTS

Hereinafter, embodiments of the present invention will be described with reference to drawings. FIGS. 1 to 6 are cross-sectional views illustrating configurations of imaging lenses according to an embodiment of the present invention, and respectively correspond to Examples 1 to 6 to be described later. FIGS. 1 to 6 show situations where an object at infinity is in focus, the left side thereof is an object side, and the right side thereof is an image side. Further, FIG. 7 is an optical path diagram of the imaging lens shown in FIG.

1, where a state where an object at infinity is in focus is shown in the upper part labeled as "infinity", and a state where a close-range object having an imaging magnification of −0.041 is in focus is shown in the lower part labeled as "β=−0.041". FIG. 7 shows on-axis rays 2 and off-axis rays 3 with the maximum angle of view, together with a lens configuration. Basic configurations and illustration methods of examples shown in FIGS. 1 to 6 are the same, and will be hereinafter described with reference to mainly the example shown in FIG. 1.

This imaging lens consists of, in order from the object side to the image side along an optical axis Z: a first lens group G1 that has a positive refractive power as a whole; a second lens group G2 that has a negative refractive power as a whole; and a third lens group G3 that has a positive or negative refractive power as a whole. In the example shown in FIG. 1, the first lens group G1 includes, in order from the object side, seven lenses, that is, lenses L11 to L17, the second lens group G2 includes only one lens, that is, a lens L21, and the third lens group G3 includes, in order from the object side, two lenses, that is, lenses L31 and L32.

Figure 1:
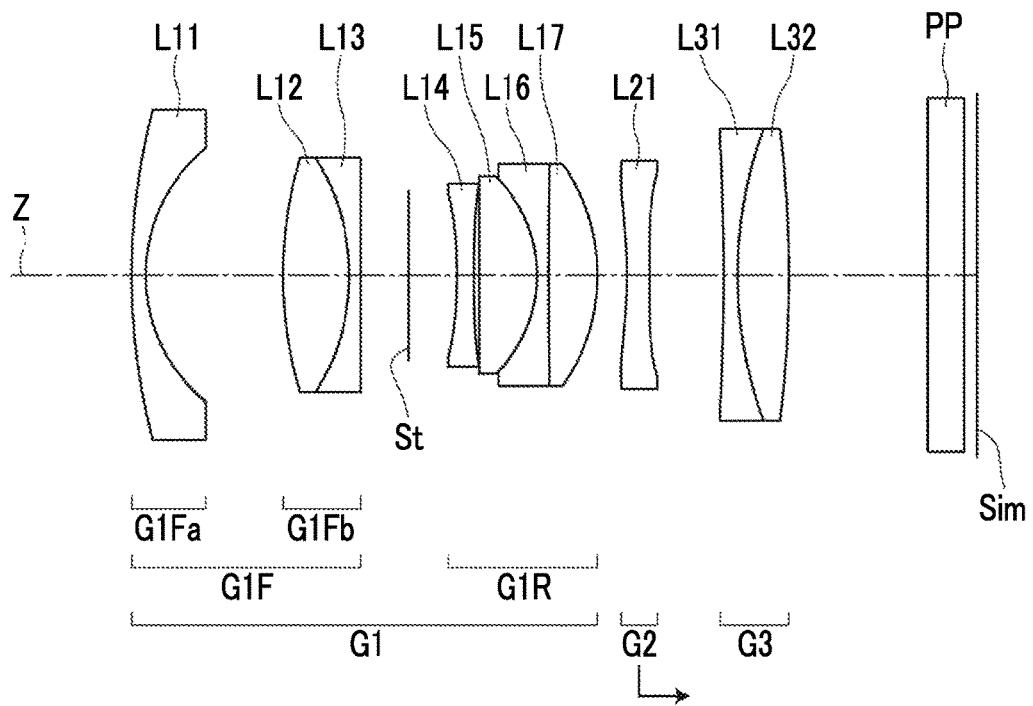
FIG. 1 is a cross-sectional view illustrating a configuration of an imaging lens of Example 1 of the present invention.

FIG. 1 shows an example in which an optical member PP having a plane parallel plate shape is disposed between the lens system and the image plane Sim. The optical member PP is assumed to be an infrared cut filter, a low pass filter, various other filters, a cover glass, and/or the like. In the present invention, the optical member PP may be disposed at a position different from that in the example of FIG. 1, or the optical member PP may be omitted.

The imaging lens is configured such that, during focusing from an object at infinity to a close-range object, the first lens group G1 and the third lens group G3 remain stationary with respect to the image plane Sim, and the second lens group G2 moves from the object side to the image side. Further, the second lens group G2 is formed of only one negative lens. The arrow under the second lens group G2 of FIG. 1 indicates a direction in which the second lens group G2 move during focusing from the object at infinity to the close-range object.

By employing an inner focusing system, it is possible to reduce a load to a system in which a focus lens unit is driven, and it is possible to reduce a size of the focus lens unit. As a result, it is possible to reduce a size of the whole lens system. In order to cope with the demand for reduction in size of the imaging apparatus, there is also a demand for reduction in size of the lens system. Further, by adopting a configuration in which the focus lens group is formed of one lens, it is possible to achieve reduction in weight thereof, and it is possible to achieve high-speed focusing. Furthermore, by making the reference signs of a refractive power of the second lens group G2 as the focus lens group and a refractive power of the first lens group G1 different from each other, it is possible to make the refractive power of the focus lens group strong, and it is possible to decrease an amount of movement of the focus lens group during focusing.

The third lens group G3 is configured to have at least one negative lens and at least one positive lens. By arranging the positive lens and the negative lens in the third lens group G3, there is an advantage in correcting chromatic aberration and curvature of field.

The imaging lens is configured such that the second lens group G2 and the third lens group G3 satisfy the following conditional expression (1).

$$2.5<|f3/f2| \tag{1}$$

Here, f3 is a focal length of the third lens group, and f2 is a focal length of the second lens group.

By not allowing the result of the conditional expression (1) to be equal to or less than the lower limit, the refractive power of the third lens group G3 is prevented from becoming excessively strong, and thus it is possible to minimize variation in off-axis rays during focusing. Accordingly, it is possible to suppress fluctuation in curvature of field during focusing. Further, by not allowing the result of the conditional expression (1) to be equal to or less than the lower limit, the refractive power of the second lens group G2 as the focus lens group is prevented from becoming excessively weak, and thus there is an advantage in a decrease in amount of movement of the focus lens group.

In order to enhance the effect relating to the conditional expression (1), it is preferable that the following conditional expression (1-1) is satisfied. Further, it is preferable that the imaging lens satisfies the following conditional expression (1-2). By not allowing the result of the conditional expression (1-2) to be equal to or greater than the upper limit, the refractive power of the second lens group G2 is prevented from becoming excessively strong. Thus, it is possible to satisfactorily perform aberration correction even when the second lens group G2 is formed of one lens. In particular, this is advantageous in suppressing occurrence of curvature of field. Furthermore, the refractive power of the second lens group G2 is prevented from becoming excessively strong. Thus, it is possible to increase the tolerance of the eccentricity error of the focus lens group which is a movable part. As a result, it becomes easier to realize favorable performance.

$$2.7<|f3/f2| \tag{1-1}$$

$$2.7<|f3/f2|<50 \tag{1-2}$$

The first lens group G1 consists of, in order from the object side, a front group G1F that has a positive refractive power as a whole, an aperture diaphragm St, and a rear group G1R that has a positive refractive power as a whole. In the example shown in FIG. 1, the front group G1F includes lenses L11 to L13, and the rear group G1R includes lenses L14 to L7. It should be noted that the aperture diaphragm St shown in FIG. 1 does not necessarily indicate its sizes and/or shapes, and indicates a position of the diaphragm on the optical axis Z.

By forming the front group G1F, which is a lens group closest to the object side, as a lens group having a positive refractive power, it is possible to shorten a total length of the lens system. The aperture diaphragm St may be disposed between the lenses constituting the first lens group G1, and positions of the lens closest to the object side and the aperture diaphragm St may be set to be close to each other, whereby it is possible to reduce a diameter of the lens closest to the object side.

The front group G1F is configured to have at least one negative lens and at least one positive lens. By arranging the positive lens and the negative lens in the front group G1F, there is an advantage in correcting chromatic aberration and curvature of field. It is preferable that the negative lens is disposed to be closest to the object side of the front group G1F. By arranging the negative lens such that it is closest to the object side, it is possible to achieve the wide angle without increasing the diameter of the lens closest to the object side.

The front group G1F may be configured to consist of the first partial lens group G1Fa that is formed of one negative lens disposed to be closest to the object side and a second partial lens group G1Fb that is disposed to be separated by an air gap from the negative lens and has a positive refractive power as a whole. With such a configuration, the front group G1F serves as a wide converter, and thus it is possible to achieve the wide angle while correcting distortion or coma aberration.

In the configuration in which the front group G1F includes the first partial lens group G1Fa and the second partial lens group G1Fb, the second partial lens group G1Fb may be a cemented lens that is formed by cementing one positive lens and one negative lens. In such a case, by providing the cemented lens separately from the negative lens closest to the object side, it is possible to correct chromatic aberration.

The rear group G1R is configured to have at least one negative lens and at least one positive lens. By arranging the positive lens and the negative lens in the rear group G1R, there is an advantage in correcting chromatic aberration and curvature of field. Preferably, the rear group G1R has at least two negative lenses and at least two positive lenses. In such a case, by correcting various aberrations such as spherical aberration and longitudinal chromatic aberration, it is possible to reduce an aberration load of the second lens group G2 as the focus lens group.

For example, the rear group G1R may have, in order from the object side, one negative lens and three cemented lenses, and the three cemented lenses may be formed by cementing two positive lenses and one negative lens. In such a case, by arranging the three cemented lenses in the rear group G1R, it is possible to correct longitudinal chromatic aberration and lateral chromatic aberration. Further, by cementing and arranging the three lenses, as compared with a case where the three lenses each are formed of a single lens, it is possible to suppress deterioration in optical performance caused by occurrence of assembly errors. The rear group G1R in the example of FIG. 1 includes, in order from the object side, one negative lens and three cemented lenses. The three cemented lenses are formed by cementing a positive lens, a negative lens, and a positive lens in order from the object side. By forming the rear group G1R in such a manner, it is possible to obtain the above-mentioned effects while achieving reduction in size of the lens system with a small number of lenses.

The third lens group G3 may be a lens group having a positive refractive power, and may be a lens group having a negative refractive power. However, in a case where the third lens group G3 is formed as a lens group having a positive refractive power, by separating an exit pupil position from the image plane Sim, it is possible to decrease an incident angle of rays which is incident on the image plane Sim. As a result, in a case where a solid-state imaging element is disposed at a position of the image plane Sim of the imaging lens, this configuration is advantageous in favorable image acquisition. Further, in a case where the third lens group G3 is formed as a lens group having a positive refractive power, reference signs of the refractive power of the third lens group G3 and the refractive power of the second lens group G2 as the focus lens group are different. Thus, it is possible to increase the refractive power of the focus lens group, and it is possible to decrease an amount of the focus lens group during focusing.

The third lens group G3 may be configured to consist of one negative lens and one positive lens. By making the third lens group G3 include the two lenses and arranging the positive lens and the negative lens, there is an advantage in correcting chromatic aberration and curvature of field. At that time, the third lens group G3 may be configured to consist of, in order from the object side, one negative lens and one positive lens. In such a case, it is possible to decrease the incident angle of rays which are incident on the image plane Sim. Further, in a case where the third lens group G3 includes one negative lens and one positive lens, these two lenses may be cemented to each other. In addition, in a case where the lenses are cemented, there is an advantage in correcting chromatic aberration.

Next, preferred configurations relating to conditional expressions will be described. It is preferable that the imaging lens satisfies at least one or an arbitrary combination of the following conditional expressions (2) to (10).

$$0.4 < f1/f < 1.2 \quad (2)$$

$$1.68 < NdG2 \quad (3)$$

$$30 < vdG2 < 60 \quad (4)$$

$$1.5 < |f23/f1| < 5.4 \quad (5)$$

$$0.8 < |f2/f| < 3.0 \quad (6)$$

$$0.6 < |(1-\beta2^2) \times \beta3^2| < 2.3 \quad (7)$$

$$1.0 < \beta2/\beta3 < 2.6 \quad (8)$$

$$3.0 < |\beta3/f| \quad (9)$$

$$0.2 < Ds/TL < 0.5 \quad (10)$$

Here, f is a focal length of the whole system in a state where the object at infinity is in focus, f1 is a focal length of the first lens group, f2 is a focal length of the second lens group, f3 is a focal length of the third lens group, f23 is a combined focal length of the second lens group and the third lens group in a state where the object at infinity is in focus, NdG2 is a refractive index of the negative lens of the second lens group at the d line, vdG2 is an Abbe number of the negative lens of the second lens group at the d line, β2 is a lateral magnification of the second lens group in a state where the object at infinity is in focus, β3 is a lateral magnification of the third lens group in a state where the object at infinity is in focus, Ds is a distance from a lens surface closest to the object side to the diaphragm on the optical axis, and TL is a sum of a back focus as an air conversion distance and a distance on the optical axis from the lens surface closest to the object side to a lens surface closest to the image side.

By not allowing the result of the conditional expression (2) to be equal to or less than the lower limit, the refractive power of the first lens group G1 is prevented from becoming excessively strong, and thus there is an advantage in correcting spherical aberration and coma aberration occurring in the first lens group G1. By not allowing the result of the conditional expression (2) to be equal to or greater than the upper limit, the refractive power of the first lens group G1 is prevented from becoming excessively weak, and thus there is an advantage in reducing the size of the optical system. In order to enhance the effect relating to the conditional expression (2), it is more preferable that the following conditional expression (2-1) is satisfied.

$$0.5 < f1/f < 1.0 \quad (2-1)$$

By not allowing the result of the conditional expression (3) to be equal to or less than the lower limit, it is possible to increase a proportion of an amount of movement of an image plane position to the amount of movement of the focus lens group in the optical axis direction while minimizing aberrations.

By not allowing the result of the conditional expression (4) to be equal to or less than the lower limit, it is possible to suppress fluctuation in chromatic aberration caused by movement of the focus lens group. By not allowing the result of the conditional expression (4) to be equal to or greater than the upper limit, there is an advantage in correcting lateral chromatic aberration caused by the first lens group G1. In order to enhance the effect relating to the conditional expression (4), it is more preferable that the following conditional expression (4-1) is satisfied.

$$32 < vdG2 < 58 \tag{4-1}$$

In the configuration of the focus lens group, it is preferable that the conditional expressions (3) and (4) are satisfied, and it is more preferable that the conditional expressions (3) and (4-1) are satisfied. In addition, in order to use an optical material which satisfies the conditional expressions (3) and (4), it is preferable that the following conditional expression (3-1) is satisfied.

$$1.68 < NdG2 < 2.0 \tag{3-1}$$

By not allowing the result of the conditional expression (5) to be equal to or less than the lower limit, the refractive power of the first lens group G1 is prevented from becoming excessively weak, and thus there is an advantage in reducing the size of the first lens group G1. By not allowing the result of the conditional expression (5) to be equal to or greater than the upper limit, an imaging magnification of the optical system, in which the second lens group G2 and the third lens group G3 are combined, can be prevented from becoming excessively high. As a result, it is possible to minimize diameters of lenses of the second lens group G2 and lenses closer to the image side than the second lens group G2, particularly, a diameter of the lens of the focus lens group. In order to enhance the effect relating to the conditional expression (5), it is more preferable that the following conditional expression (5-1) is satisfied.

$$1.7 < |f23/f1| < 5.3 \tag{5-1}$$

By not allowing the result of the conditional expression (6) to be equal to or less than the lower limit, the refractive power of the second lens group G2 is prevented from becoming excessively strong. Thus, it is possible to satisfactorily perform aberration correction even when the second lens group G2 is formed of one lens. In particular, this is advantageous in suppressing occurrence of curvature of field. Further, it is possible to increase the tolerance of the eccentricity error of the focus lens group which is a movable part. As a result, it becomes easier to realize favorable performance. By not allowing the result of the conditional expression (6) to be equal to or greater than the upper limit, it is possible to minimize the amount of movement of the second lens group G2 during focusing. As a result, it is possible to minimize the amount of movement of the second lens group G2 during focusing, and there is an advantage in reducing the size of the whole lens system and increasing the speed of focusing. In order to enhance the effect relating to the conditional expression (6), it is more preferable that the following conditional expression (6-1) is satisfied.

$$1.0 < |f2/f| < 2.8 \tag{6-1}$$

The conditional expression (7) is an expression relating to the amount of movement of the image plane position in the optical axis direction with respect to the amount of movement of the focus lens group, and defines a sensitivity of focusing. By not allowing the result of the conditional expression (7) to be equal to or less than the lower limit, it is possible to decrease the amount of movement of the focus lens group. As a result, there is an advantage in reducing the whole lens system. Further, by not allowing the result of the conditional expression (7) to be equal to or less than the lower limit, there is an advantage in reducing the shortest imaging distance. By not allowing the result of the conditional expression (7) to be equal to or greater than the upper limit, the refractive power of the second lens group G2 is prevented from becoming excessively strong. Thus, it is possible to suppress occurrence various aberrations, particularly, curvature of field. In order to enhance the effect relating to the conditional expression (7), it is more preferable that the following conditional expression (7-1) is satisfied.

$$0.7 < |(1-\beta 2^2) \times \beta 3^2| < 2.1 \tag{7-1}$$

By not allowing the result of the conditional expression (8) to be equal to or less than the lower limit, it is possible to minimize the amount of movement of the focus lens group. By not allowing the result of the conditional expression (8) to be equal to or greater than the upper limit, it is possible to suppress occurrence of eccentric coma aberration caused by eccentricity of the second lens group G2. In order to enhance the effect relating to the conditional expression (8), it is more preferable that the following conditional expression (8-1) is satisfied.

$$1.1 < \beta 2/\beta 3 < 2.4 \tag{8-1}$$

By not allowing the result of the conditional expression (9) to be equal to or less than the lower limit, it is possible to minimize spherical aberration and curvature of field occurring in the third lens group G3. In order to enhance the effect relating to the conditional expression (9), it is more preferable that the following conditional expression (9-1) is satisfied. Further, a configuration may have been made such that the following conditional expression (9-2) is satisfied. By not allowing the result of the conditional expression (9-2) to be equal to or greater than the upper limit, by separating an exit pupil position from the image plane Sim, it becomes easier to decrease the incident angle of rays which are incident on the image plane Sim.

$$3.5 < |f3/f| \tag{9-1}$$

$$3.5 < f3/f < 50 \tag{9-2}$$

By not allowing the result of the conditional expression (10) to be equal to or less than the lower limit, it is possible to minimize the diameter of the lenses of the lens group disposed to be closer to the image side than the aperture diaphragm St. If the result of the conditional expression (10) is equal to or less than the lower limit and rays passing through the lenses closer to the image side than the aperture diaphragm St become thick, a load of correction of aberrations in the lenses closer to the image side than the aperture diaphragm St increases. Thus, it becomes necessary to increase the number of lenses, and in some cases, it becomes necessary to increase the number of lenses of the focus lens group. Therefore, this configuration is not preferable. By not allowing the result of the conditional expression (10) to be equal to or greater than the upper limit, it is possible to decrease the diameter of the lens closest to the object side. By making the imaging lens satisfy the conditional expression (10), it is possible to thin a lens barrel while satisfactorily correcting aberrations. As a result, it is possible to achieve reduction in size of the apparatus. In order to enhance the effect relating to the conditional expression (10), it is more preferable that the following conditional expression (10-1) is satisfied.

$$0.24 < Ds/TL < 0.42 \quad (10\text{-}1)$$

It should be noted that the above-mentioned preferred configurations and available configurations may be arbitrary combinations, and it is preferable to selectively adopt the configurations in accordance with required specification.

Next, numerical examples of the imaging lens of the present invention will be described.

Example 1

A lens configuration of an imaging lens of Example 1 is shown in FIG. 1, and an illustration method and a configuration thereof are as described above. Therefore, repeated description is omitted herein. The imaging lens of Example 1 includes, in order from the object side: a first lens group G1 that has a positive refractive power; a second lens group G2 that has a negative refractive power; and a third lens group G3 that has a positive refractive power.

Table 1 shows basic lens data of the imaging lens of Example 1, Table 2 shows variable surface spacings, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side when an object side surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3 . . . ) component at the d line (a wavelength of 587.6 nm), where j sequentially increases toward the image side when the surface of the element closest to the object side is regarded as the first surface. The column of vdj shows an Abbe number of the j-th component on the basis of the d line. The column of θgFj shows a partial dispersion ratio between the g line (a wavelength of 435.8 nm) and the F line (a wavelength of 486.1 nm) of the j-th component. It should be noted that the partial dispersion ratio θgF of a certain lens between the g line and the F line is defined as θgF=(Ng− NF)/(NF−NC) when the refractive indexes of the lens at the g line, the F line, and the C line (a wavelength of 656.3 nm) are respectively referred to as Ng, NF, and NC.

Here, reference signs of radii of curvature of surface shapes convex toward the object side are set to be positive, and reference signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a spacing between the image plane Sim and the surface closest to the image side in the table. The upper part outside a range of Table 1 shows the focal length f of the whole system, the F number FNo., and the maximum total angle of view 2ω, on the basis of d line.

In Table 1, the variable surface spacings, which are variable during focusing, are referenced by the reference signs DD[ ], and are written into places of Di, where object side surface numbers of spacings are noted in [ ]. Table 2 shows values of variable surface spacings, on the basis of the d line. In Table 2, the values of the variable surface spacings, which are in a state where an object at infinity is in focus and a state where a close-range object at which an imaging magnification β of the whole system is −0.041 is in focus, are respectively noted in the columns "infinity" and "β=− 0.041".

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E-n" (n: an integer) in numerical values of the aspheric coefficients of Table 3 indicates "×10<sup>−n</sup>". The aspheric coefficients are values of the coefficients KA and Am (m=3, 4, 5, . . . 20 or m=4, 6, 8, 10) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

Example 1
f = 22.377, FNo. = 2.06, 2ω = 64.8°

| Si | Ri | Di | Ndj | vdj | θgFj |
|---|---|---|---|---|---|
| 1 | 52.50599 | 1.090 | 1.51633 | 64.14 | 0.53531 |
| 2 | 13.05602 | 10.740 | | | |
| 3 | 32.33553 | 5.210 | 1.88300 | 40.76 | 0.56679 |
| 4 | −17.32000 | 0.890 | 1.68893 | 31.07 | 0.60041 |
| 5 | ∞ | 3.730 | | | |
| 6(St) | ∞ | 3.770 | | | |
| *7 | −36.88742 | 1.300 | 1.84887 | 40.12 | 0.57197 |
| *8 | 120.80883 | 0.420 | | | |
| 9 | ∞ | 4.560 | 1.81600 | 46.62 | 0.55682 |
| 10 | −10.97500 | 0.910 | 1.68893 | 31.07 | 0.60041 |
| 11 | 446.78000 | 3.790 | 1.88300 | 40.76 | 0.56679 |
| 12 | −15.50860 | DD [12] | | | |
| *13 | −32.42595 | 1.750 | 1.80312 | 40.54 | 0.56551 |
| *14 | 2385.05256 | DD [14] | | | |
| 15 | −205.25324 | 1.100 | 1.78470 | 26.29 | 0.61360 |
| 16 | 33.79000 | 3.980 | 1.80400 | 46.58 | 0.55730 |
| 17 | −96.69231 | 10.862 | | | |
| 18 | ∞ | 2.850 | 1.51680 | 64.20 | 0.53430 |
| 19 | ∞ | 1.000 | | | |

TABLE 2

Example 1

| | INFINITY | β = −0.041 |
|---|---|---|
| DD [12] | 2.312 | 2.984 |
| DD [14] | 5.764 | 5.092 |

TABLE 3

Example 1

SURFACE NUMBER

| | 7 | 8 | 13 | 14 |
|---|---|---|---|---|
| KA | 1.0000000E+00 | 1.0000000E+00 | 1.0000000E+00 | 1.0000000E+00 |
| A3 | 1.5073532E−04 | 2.5439114E−04 | 1.1475882E−04 | 2.2255579E−05 |
| A4 | −1.1467085E−04 | −9.1808037E−05 | 9.4330279E−05 | 1.4188125E−04 |
| A5 | −2.5158022E−05 | 7.5153059E−06 | 4.0970098E−06 | −5.2116815E−08 |
| A6 | 2.7115028E−05 | 3.4413909E−05 | −1.6458052E−07 | −3.3414964E−07 |
| A7 | −2.6530657E−06 | −9.3493840E−06 | −1.3961895E−08 | −2.9038350E−09 |
| A8 | −2.7494956E−06 | −2.5271341E−06 | −8.0154932E−10 | 2.9999049E−09 |
| A9 | 6.4552685E−07 | 1.2301067E−06 | 1.6071861E−10 | 4.5010731E−10 |
| A10 | 1.1322721E−07 | 5.2583751E−08 | 3.6880972E−11 | 3.7798784E−11 |
| A11 | −4.7857408E−08 | −7.6395204E−08 | 4.3306258E−12 | 5.3163730E−12 |
| A12 | −1.0785306E−09 | 2.8925500E−09 | 2.2470515E−13 | −9.2257398E−13 |
| A13 | 1.8203001E−09 | 2.6477596E−09 | −3.4824709E−14 | −2.5562964E−13 |
| A14 | −7.5189036E−11 | −2.0845725E−10 | −1.7660620E−14 | 1.1944812E−14 |
| A15 | −3.8314367E−11 | −5.2489457E−11 | −1.0771212E−15 | −2.0402486E−15 |
| A16 | 2.9096315E−12 | 5.4161891E−12 | −1.8639544E−16 | −1.4848757E−16 |
| A17 | 4.2481861E−13 | 5.5711588E−13 | 2.8875371E−17 | 2.8123105E−17 |
| A18 | −4.1411358E−14 | −6.6500124E−14 | 4.7797588E−18 | 1.1218178E−17 |
| A19 | −1.9323433E−15 | −2.4586981E−15 | 5.1689957E−19 | 1.8795160E−19 |
| A20 | 2.1635158E−16 | 3.2167677E−16 | −9.3666797E−20 | −1.2793914E−19 |

Figure 8:
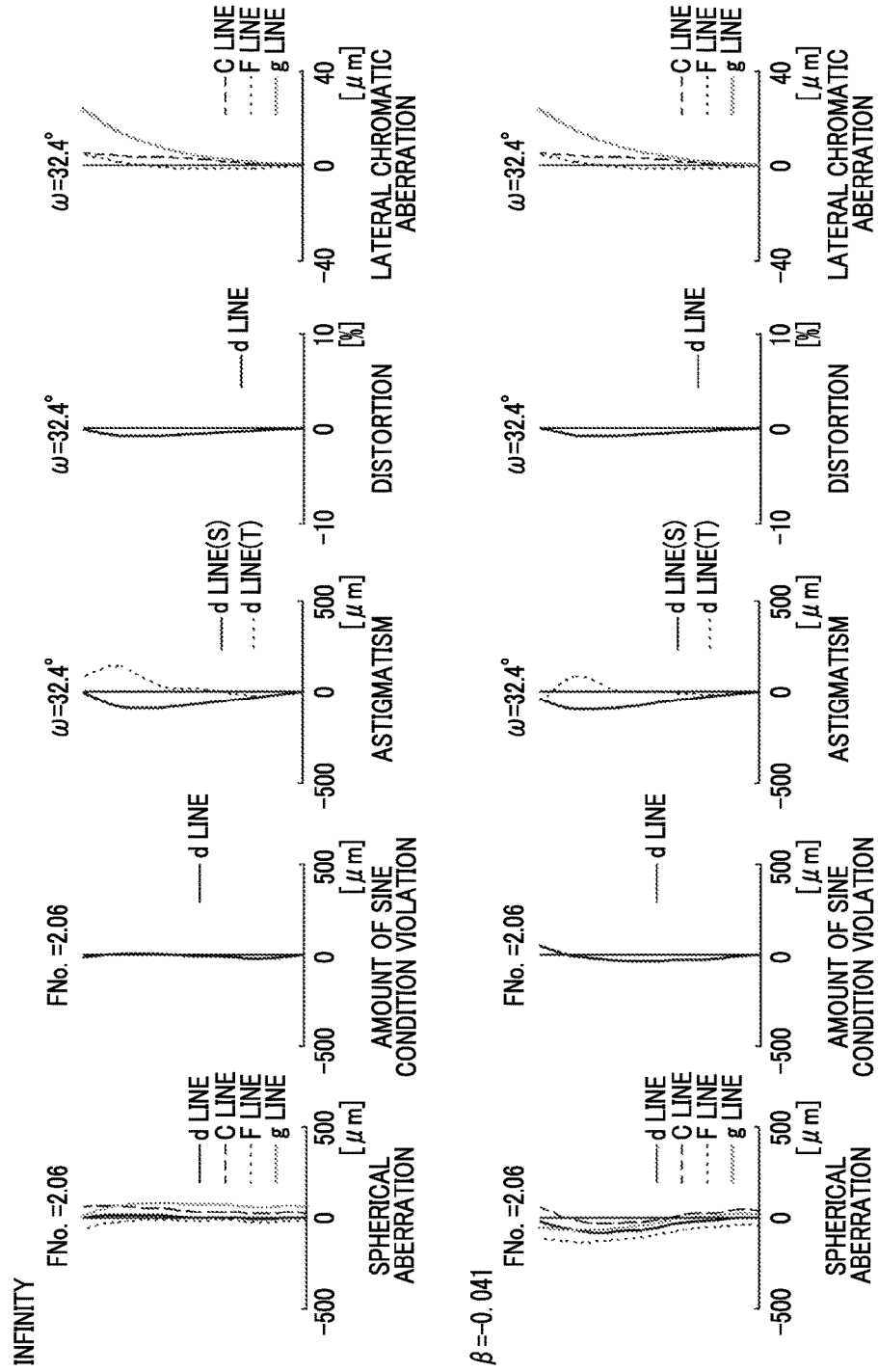
FIG. 8 is a diagram of aberrations of the imaging lens of Example 1 of the present invention.

FIG. 8 shows aberration diagrams of the imaging lens of Example 1. In FIG. 8, aberration diagrams in a state where an object at infinity is in focus are shown in the upper part labeled as "infinity", and aberration diagrams in a state where a close-range object having an imaging magnification of −0.041 is in focus are shown in the lower part labeled as "β=−0.041". Further, in FIG. 8, spherical aberration, an amount of sine condition violation, astigmatism, distortion, and lateral chromatic aberration (chromatic aberration of magnification) are shown in order from the left. In the spherical aberration diagram, aberrations at the d line, the C line, the F line, and the g line are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the diagram of the amount of sine condition violation and the distortion diagram, aberration at the d line is indicated by the solid line. In the lateral chromatic aberration, aberrations at the C line, the F line, and the g line are respectively indicated by the long dashed line, the short dashed line, and the gray solid line. In FIG. 8. FNo. indicates an F number, and ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 2:
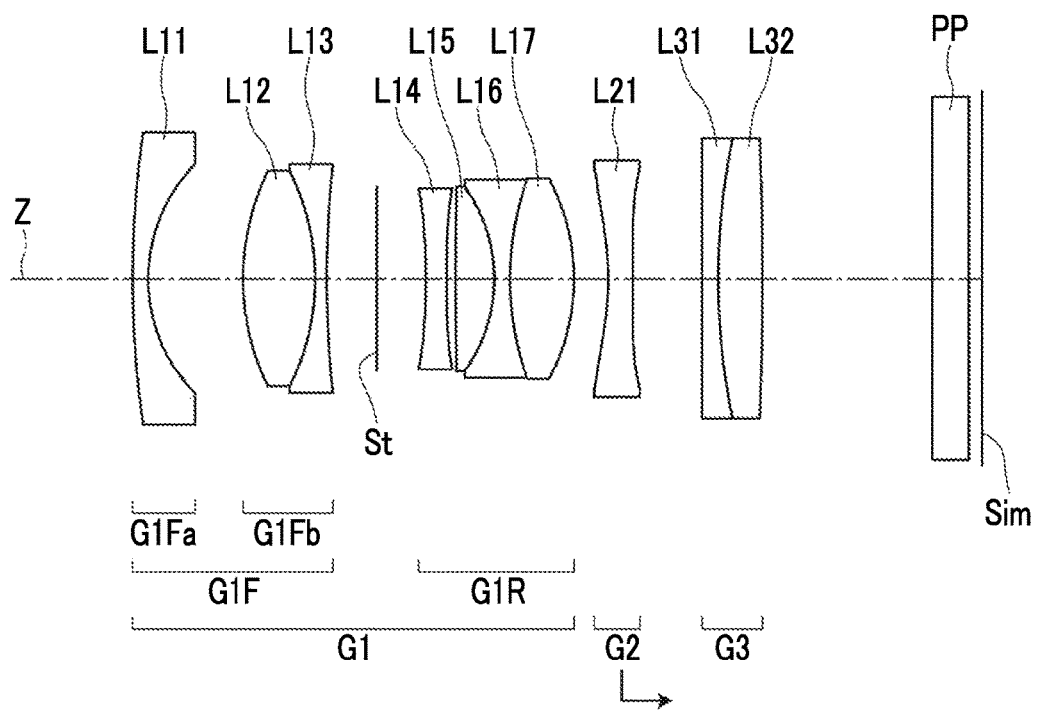
FIG. 2 is a cross-sectional view illustrating a configuration of an imaging lens of Example 2 of the present invention.
Figure 9:
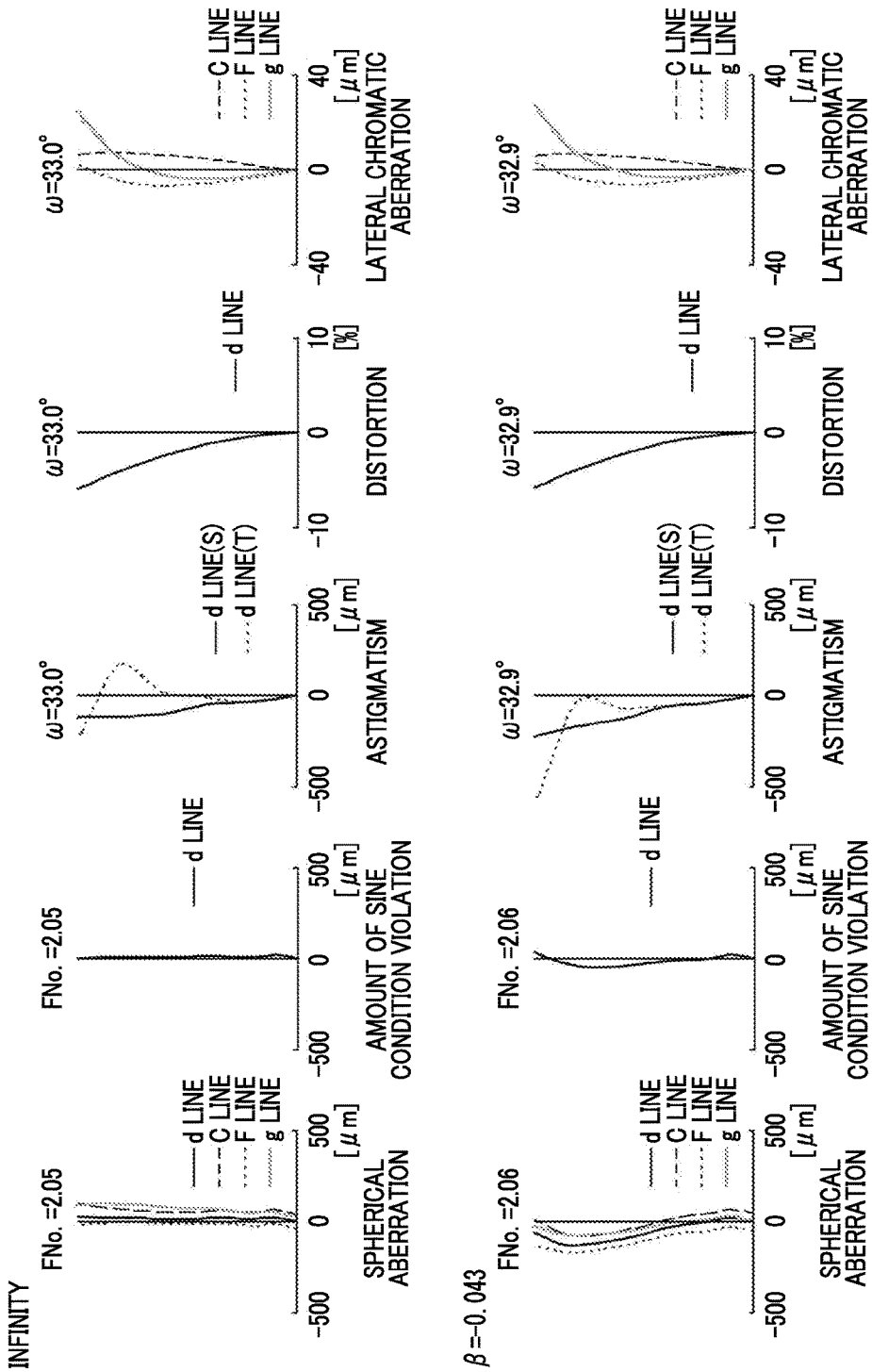
FIG. 9 is a diagram of aberrations of the imaging lens of Example 2 of the present invention.

FIG. 2 shows a lens configuration of the imaging lens of Example 2. A group configuration of an imaging lens of Example 2, the lens groups moving during focusing, a direction of movement of the lens groups, and the number of lenses constituting each lens group are the same as those of Example 1. Table 4 shows basic lens data of the imaging lens of Example 2, Table 5 shows variable surface spacings, and Table 6 shows aspheric coefficients thereof. In FIG. 9, aberration diagrams in a state where an object at infinity is in focus are shown in the upper part thereof, and aberration diagrams in a state where a close-range object having an imaging magnification of −0.043 is in focus are shown in the lower part thereof.

TABLE 4

Example 2
f = 23.690, FNo. = 2.05, 2ω = 66.0°

| Si | Ri | Di | Ndj | νdj | θgFj |
|---|---|---|---|---|---|
| 1 | 80.28774 | 1.200 | 1.58913 | 61.13 | 0.54067 |
| 2 | 12.94817 | 7.405 | | | |
| 3 | 19.46710 | 5.594 | 1.66672 | 48.32 | 0.56101 |
| 4 | −18.92916 | 0.900 | 1.48749 | 70.24 | 0.53007 |
| 5 | 85.93793 | 3.917 | | | |
| 6(St) | ∞ | 3.800 | | | |
| *7 | −57.14426 | 1.600 | 1.68893 | 31.08 | 0.59860 |
| *8 | 121.13520 | 0.700 | | | |
| 9 | 328.38350 | 3.010 | 1.77250 | 49.60 | 0.55212 |
| 10 | −12.49994 | 1.210 | 1.74000 | 28.30 | 0.60790 |
| 11 | 23.30714 | 5.000 | 1.88300 | 40.76 | 0.56679 |
| 12 | −16.98080 | DD[12] | | | |
| *13 | −21.35737 | 1.900 | 1.69350 | 53.20 | 0.54661 |
| *14 | −173.17679 | DD[14] | | | |
| 15 | ∞ | 1.260 | 1.51823 | 58.90 | 0.54567 |
| 16 | 54.97426 | 3.421 | 1.85150 | 40.78 | 0.56958 |
| 17 | −283.37615 | 13.204 | | | |
| 18 | ∞ | 2.850 | 1.51680 | 64.20 | 0.53430 |
| 19 | ∞ | 1.000 | | | |

TABLE 5

| | Example 2 | |
|---|---|---|
| | INFINITY | β = −0.043 |
| DD[12] | 2.664 | 3.308 |
| DD[14] | 5.359 | 4.715 |

TABLE 6

| | Example 2 | | | |
|---|---|---|---|---|
| SURFACE NUMBER | 7 | 8 | 13 | 14 |
| KA | 1.0000000E+00 | 1.0000000E+00 | 1.0000000E+00 | 1.0000000E+00 |
| A3 | −8.1586517E−05 | −9.6902953E−05 | 2.5198686E−04 | 4.5273507E−04 |
| A4 | −1.7029256E−05 | 1.1616329E−04 | −5.5304541E−05 | −3.4426008E−04 |
| A5 | 1.3073737E−06 | −8.8161201E−06 | 1.4275820E−04 | 2.4060323E−04 |
| A6 | −3.7666313E−07 | 1.0049367E−06 | −6.5769951E−05 | −2.1041552E−05 |
| A7 | −2.6576593E−08 | 1.2229448E−07 | 2.3543672E−05 | −1.8282856E−05 |
| A8 | 1.4280700E−09 | −2.0060995E−08 | −4.2840366E−06 | 5.3107898E−06 |
| A9 | 2.6820430E−10 | −1.5149993E−09 | −5.4270367E−07 | 3.7522709E−08 |
| A10 | 8.9832531E−13 | −2.1366303E−10 | 3.7919154E−07 | −2.0232097E−07 |
| A11 | −5.9473705E−12 | −9.8720849E−12 | −3.7105397E−08 | 2.0090619E−08 |
| A12 | −1.1251456E−12 | 1.2284589E−12 | −8.3836956E−09 | 2.7056878E−09 |
| A13 | −1.3657073E−13 | 3.2103385E−13 | 1.7699125E−09 | −5.2930612E−10 |
| A14 | −1.0922969E−14 | 4.3875888E−14 | 3.6956690E−11 | −4.3270673E−12 |
| A15 | 5.1737552E−17 | 3.3886960E−15 | −2.9861375E−11 | 5.4637676E−12 |
| A16 | 2.4114718E−16 | −1.5310723E−16 | 9.9679665E−13 | −1.8968440E−13 |
| A17 | 4.0537675E−17 | −9.2782594E−17 | 2.2798919E−13 | −2.3303956E−14 |
| A18 | 4.8177968E−18 | −1.5673953E−17 | −1.3533079E−14 | 1.3738644E−15 |
| A19 | 3.4156492E−20 | −1.5374965E−18 | −6.7579132E−16 | 2.7137500E−17 |
| A20 | −1.0516332E−19 | 3.9119462E−19 | 5.0852217E−17 | −2.3406678E−18 |

Example 3

Figure 3:
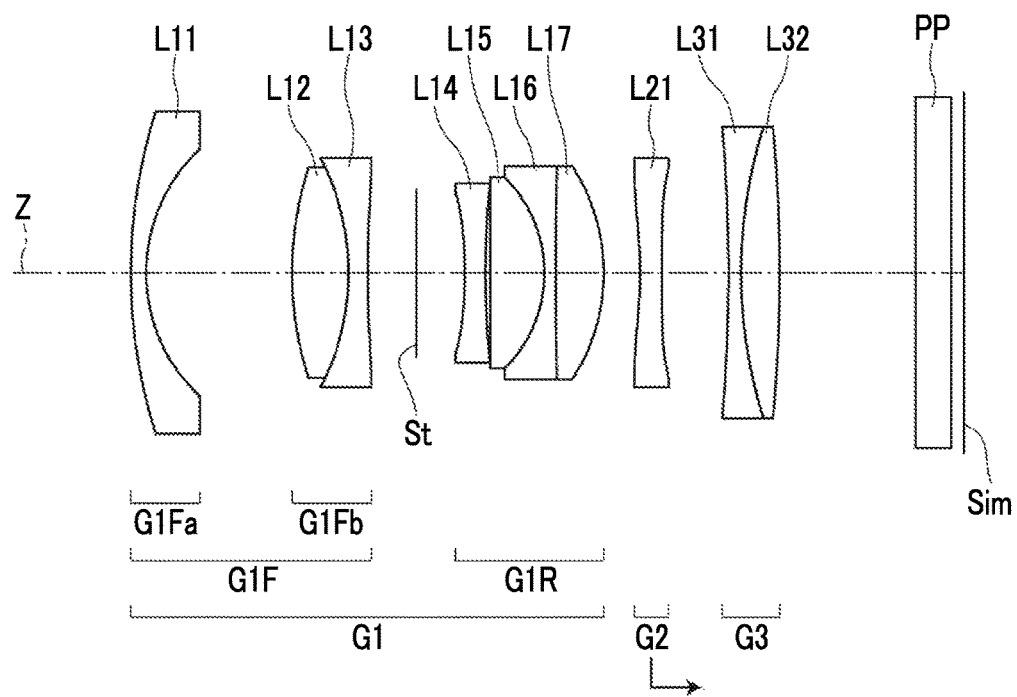
FIG. 3 is a cross-sectional view illustrating a configuration of an imaging lens of Example 3 of the present invention.
Figure 10:
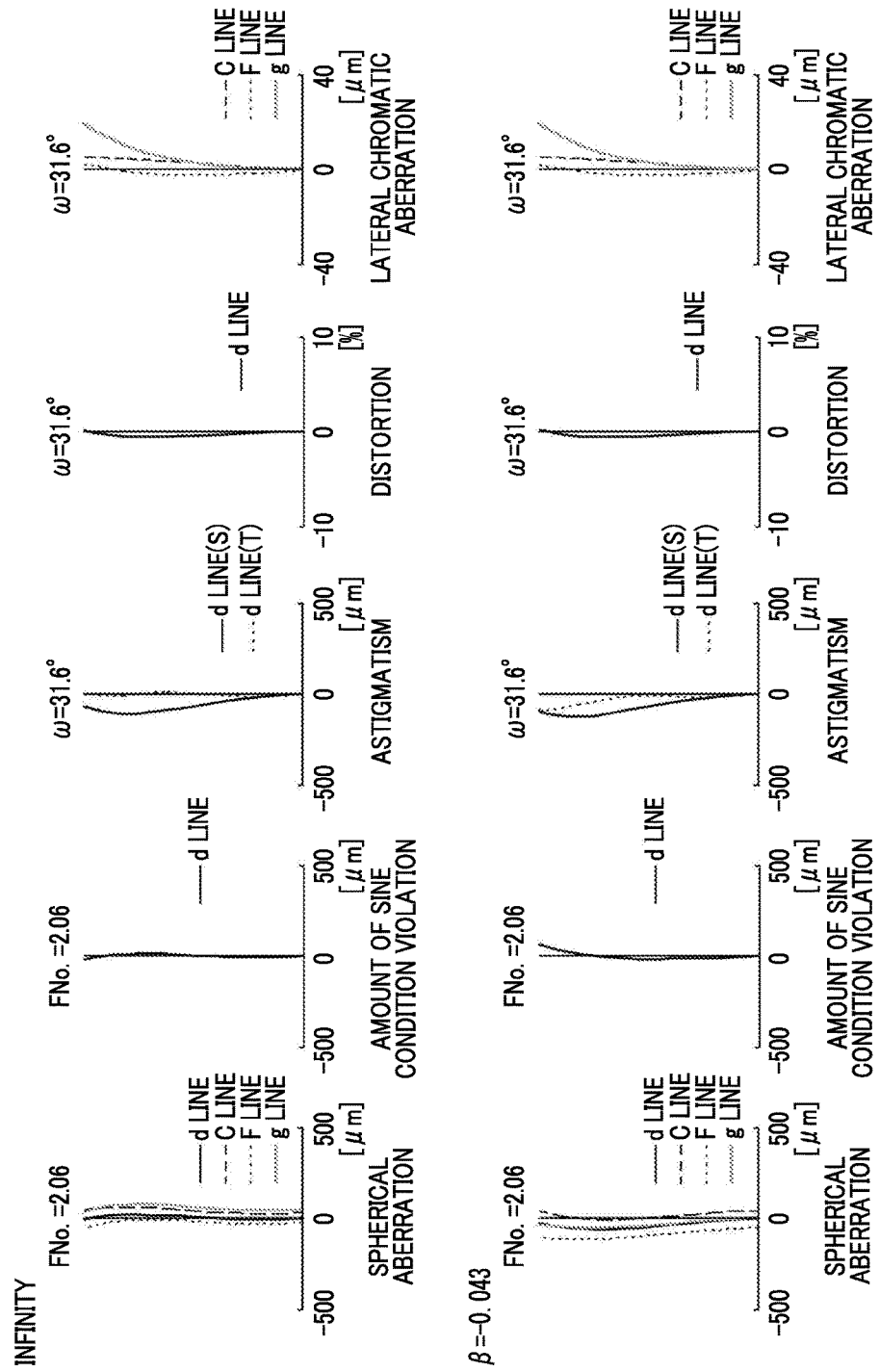
FIG. 10 is a diagram of aberrations of the imaging lens of Example 3 of the present invention.

FIG. 3 shows a lens configuration of the imaging lens of Example 3. A group configuration of an imaging lens of Example 3, the lens groups moving during focusing, a direction of movement of the lens groups, and the number of lenses constituting each lens group are the same as those of Example 1. Table 7 shows basic lens data of the imaging lens of Example 3, Table 8 shows variable surface spacings, and Table 9 shows aspheric coefficients thereof. In FIG. 10, aberration diagrams in a state where an object at infinity is in focus are shown in the upper part thereof, and aberration diagrams in a state where a close-range object having an imaging magnification of −0.043 is in focus are shown in the lower part thereof.

TABLE 7

| | Example 3 f = 23.479, FNo. = 2.06, 2ω = 63.2° | | | | |
|---|---|---|---|---|---|
| Si | Ri | Di | Ndj | vdj | θgFj |
| 1 | 43.80935 | 1.221 | 1.51680 | 64.20 | 0.53430 |
| 2 | 13.86141 | 11.662 | | | |
| 3 | 28.23160 | 4.535 | 1.88300 | 40.76 | 0.56679 |
| 4 | −19.91396 | 1.539 | 1.68893 | 31.07 | 0.60041 |
| 5 | 115.82290 | 3.849 | | | |
| 6(St) | ∞ | 3.864 | | | |
| *7 | −37.46229 | 1.652 | 1.85135 | 40.10 | 0.56954 |
| *8 | 101.98958 | 0.375 | | | |
| 9 | ∞ | 4.363 | 1.81600 | 46.62 | 0.55682 |
| 10 | −10.97737 | 0.910 | 1.68893 | 31.07 | 0.60041 |
| 11 | 409.90086 | 3.817 | 1.88300 | 40.76 | 0.56679 |
| 12 | −15.88970 | DD[12] | | | |
| *13 | −35.66547 | 1.750 | 1.80610 | 40.73 | 0.56940 |
| *14 | −583.58957 | DD[14] | | | |
| 15 | −137.02433 | 1.010 | 1.78472 | 25.68 | 0.61621 |

TABLE 7-continued

| | Example 3 f = 23.479, FNo. = 2.06, 2ω = 63.2° | | | | |
|---|---|---|---|---|---|
| Si | Ri | Di | Ndj | vdj | θgFj |
| 16 | 39.76966 | 3.063 | 1.83481 | 42.72 | 0.56486 |
| 17 | −130.11553 | 10.864 | | | |
| 18 | ∞ | 2.850 | 1.51680 | 64.20 | 0.53430 |
| 19 | ∞ | 1.000 | | | |

TABLE 8

| | Example 3 | |
|---|---|---|
| | INFINITY | β = −0.043 |
| DD[12] | 2.873 | 3.780 |
| DD[14] | 5.297 | 4.390 |

TABLE 9

| | Example 3 | |
|---|---|---|
| SURFACE NUMBER | 7 | 8 |
| KA | 1.0000000E+00 | 1.0000000E+00 |
| A4 | −5.0859484E−05 | 6.5707117E−05 |
| A6 | −7.3150562E−07 | −1.0062069E−07 |
| A8 | −7.3366668E−09 | −8.5773005E−09 |
| A10 | 1.4752281E−11 | 5.3747108E−11 |
| SURFACE NUMBER | 13 | 14 |
| KA | 1.0000000E+00 | 1.0000000E+00 |
| A3 | 5.8445955E−05 | 5.9413305E−05 |
| A4 | 9.4078976E−05 | 9.5638470E−05 |
| A5 | 3.3884775E−06 | 3.8722972E−06 |
| A6 | −1.5580692E−07 | −8.8569918E−08 |

TABLE 9-continued

| | Example 3 | |
|---|---|---|
| A7 | −8.2006928E−09 | −3.3680722E−08 |
| A8 | −7.9681535E−10 | −1.8368590E−09 |
| A9 | 8.8678822E−12 | 1.0482375E−10 |
| A10 | 7.3280732E−12 | 3.1531137E−11 |
| A11 | 1.1154491E−12 | 4.5784355E−12 |
| A12 | 5.0224221E−14 | 3.0147554E−13 |
| A13 | −7.8852029E−16 | −3.3106384E−14 |
| A14 | −5.1217622E−15 | −7.9498759E−15 |
| A15 | 3.4980616E−16 | −1.6711317E−15 |
| A16 | −1.0893060E−16 | −9.2901449E−17 |
| A17 | 1.2621754E−17 | 1.4769206E−17 |
| A18 | 1.1656723E−18 | 3.9796371E−18 |
| A19 | 1.4904524E−19 | 4.7713118E−19 |
| A20 | −3.2811996E−20 | −7.9561222E−20 |

Example 4

Figure 4:
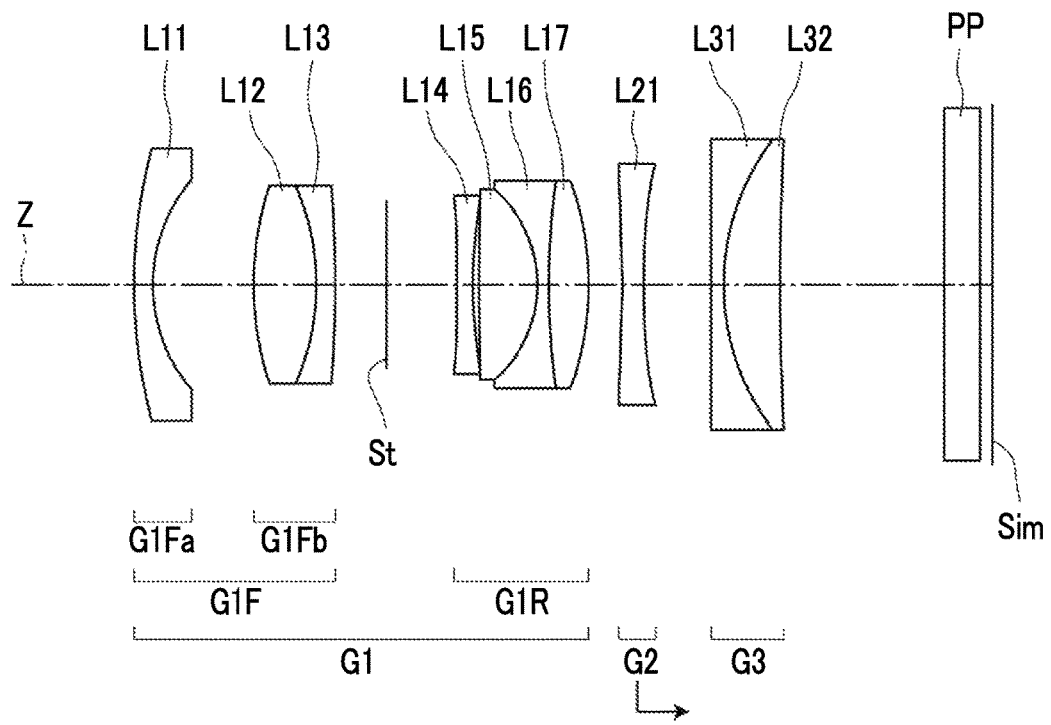
FIG. 4 is a cross-sectional view illustrating a configuration of an imaging lens of Example 4 of the present invention.

FIG. 4 shows a lens configuration of the imaging lens of Example 4. A group configuration of an imaging lens of Example 4, the lens groups moving during focusing, a direction of movement of the lens groups, and the number of lenses constituting each lens group are the same as those of Example 1. Table 10 shows basic lens data of the imaging lens of Example 4, Table 11 shows variable surface spacings, and Table 12 shows aspheric coefficients thereof. In FIG. 11, aberration diagrams in a state where an object at infinity is in focus are shown in the upper part thereof, and aberration diagrams in a state where a close-range object having an imaging magnification of −0.045 is in focus are shown in the lower art thereof.

TABLE 10

Example 4
$f = 24.527$, FNo. $= 2.38$, $2\omega = 62.8°$

| Si | Ri | Di | Ndj | vdj | θgFj |
|---|---|---|---|---|---|
| 1 | 43.97844 | 1.500 | 1.75500 | 52.32 | 0.54765 |
| 2 | 13.25118 | 8.093 | | | |
| 3 | 26.09458 | 5.010 | 1.69680 | 55.53 | 0.54341 |
| 4 | −20.08539 | 1.500 | 1.51633 | 64.14 | 0.53531 |
| 5 | −102.16112 | 4.077 | | | |
| 6(St) | ∞ | 5.614 | | | |
| *7 | −480.18473 | 1.300 | 1.85135 | 40.10 | 0.56954 |
| *8 | 41.79826 | 0.492 | | | |
| 9 | 285.69331 | 4.707 | 1.83481 | 42.72 | 0.56486 |
| 10 | −10.25301 | 0.910 | 1.69895 | 30.13 | 0.60298 |
| 11 | 61.82409 | 3.183 | 1.88300 | 40.76 | 0.56679 |
| 12 | −24.90530 | DD[12] | | | |
| *13 | −66.54907 | 1.750 | 1.71300 | 53.87 | 0.54587 |
| *14 | 142.08786 | DD[14] | | | |
| 15 | ∞ | 1.010 | 1.59270 | 35.31 | 0.59336 |
| 16 | 19.52850 | 4.500 | 1.75500 | 52.32 | 0.54765 |
| 17 | 242.35915 | 13.149 | | | |
| 18 | ∞ | 2.850 | 1.51680 | 64.20 | 0.53430 |
| 19 | ∞ | 1.000 | | | |

TABLE 11

| | Example 4 | |
|---|---|---|
| | INFINITY | β = −0.045 |
| DD[12] | 2.664 | 4.006 |
| DD[14] | 5.359 | 4.017 |

TABLE 12

| | Example 4 | | | |
|---|---|---|---|---|
| SURFACE NUMBER | 7 | 8 | 13 | 14 |
| KA | 1.0000000E+00 | 1.0000000E+00 | 1.0000000E+00 | 1.0000000E+00 |
| A3 | 4.6905019E−04 | 4.3531826E−04 | 2.6885318E−04 | 4.9327168E−04 |
| A4 | −9.1730786E−05 | 5.3426371E−07 | −1.0112951E−04 | −3.7547267E−04 |
| A5 | 3.9819032E−06 | −9.4447434E−06 | 1.4146503E−04 | 2.3159769E−04 |
| A6 | −1.5212145E−06 | −4.2562299E−07 | −6.6895881E−05 | −1.9724966E−05 |
| A7 | 5.6798443E−09 | 2.3711352E−07 | 2.3542587E−05 | −1.8348470E−05 |
| A8 | 3.4981423E−08 | −6.5993836E−08 | −4.2557659E−06 | 5.3047345E−06 |
| A9 | −1.7880681E−08 | 3.1329666E−09 | −5.4276345E−07 | 3.6488021E−08 |
| A10 | 1.4385555E−09 | −1.6390885E−10 | 3.7921900E−07 | −2.0227440E−07 |
| A11 | 1.0850454E−10 | 9.0490838E−11 | −3.7187620E−08 | 2.0094080E−08 |
| A12 | 1.4003008E−11 | 5.0973906E−12 | −8.3844534E−09 | 2.7072678E−09 |
| A13 | −4.4461725E−13 | 1.0714459E−12 | 1.7692189E−09 | −5.2913184E−10 |
| A14 | −1.2997858E−13 | −3.1761927E−13 | 3.7091146E−11 | −4.3293031E−12 |
| A15 | −4.9436678E−14 | −3.6099197E−14 | −2.9853401E−11 | 5.4664788E−12 |
| A16 | −4.0134166E−15 | 5.4398230E−15 | 1.0023394E−12 | −1.8953565E−13 |
| A17 | −4.6353567E−16 | −2.6183355E−16 | 2.2791973E−13 | −2.3457025E−14 |
| A18 | 9.4133237E−17 | 3.9044277E−17 | −1.3659770E−14 | 1.3751861E−15 |
| A19 | 4.9314373E−17 | −2.0940941E−19 | −6.7861690E−16 | 2.6214104E−17 |
| A20 | −4.9350539E−18 | −1.7744135E−19 | 5.1918944E−17 | −2.1533542E−18 |

Example 5

Figure 5:
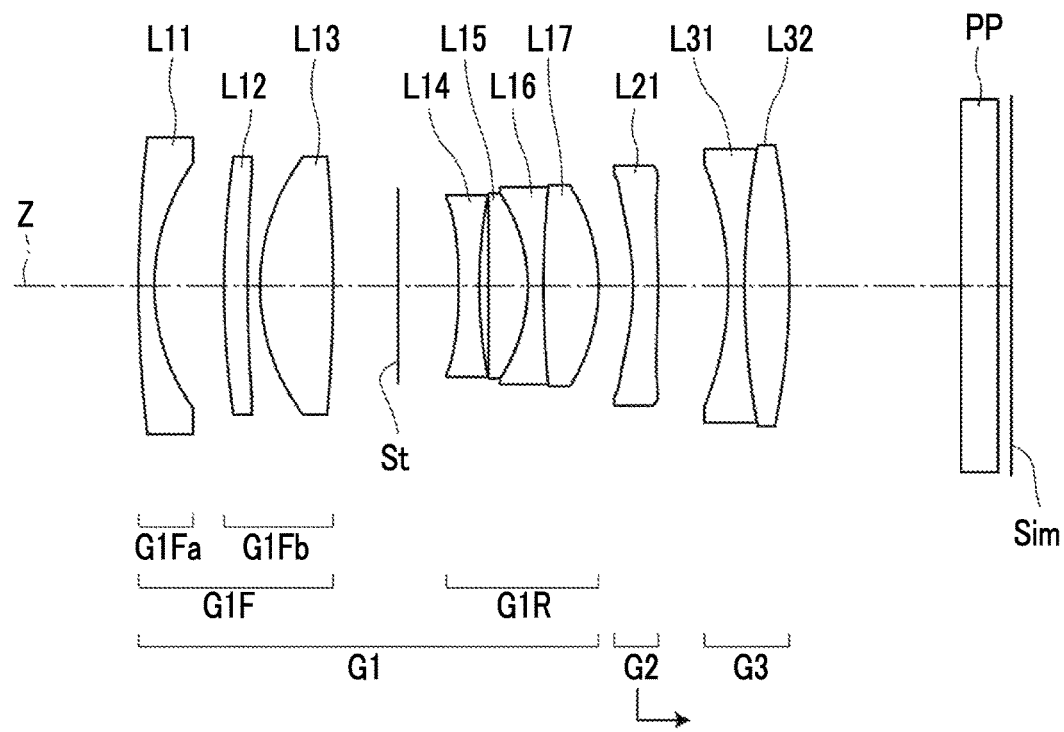
FIG. 5 is a cross-sectional view illustrating a configuration of an imaging lens of Example 5 of the present invention.

FIG. 5 shows a lens configuration of the imaging lens of Example 5. A group configuration of an imaging lens of Example 5, the lens groups moving during focusing, a direction of movement of the lens groups, and the number of lenses constituting each lens group are the same as those of Example 1. Table 13 shows basic lens data of the imaging lens of Example 5, Table 14 shows variable surface spacings, and Table 15 shows aspheric coefficients thereof. In FIG. 12, aberration diagrams in a state where an object at infinity is in focus are shown in the upper part thereof, and aberration diagrams in a state where a close-range object having an imaging magnification of −0.052 is in focus are shown in the lower part thereof.

TABLE 13

Example 5
f = 28.409, FNo. = 2.14, 2ω = 55.8°

| Si | Ri | Di | Ndj | vdj | θgFj |
|---|---|---|---|---|---|
| 1 | 99.34047 | 1.200 | 1.72916 | 54.68 | 0.54451 |
| 2 | 16.73783 | 5.344 | | | |
| 3 | 70.71428 | 1.800 | 1.95906 | 17.47 | 0.65993 |
| 4 | 116.11504 | 1.000 | | | |
| 5 | 16.77733 | 5.584 | 1.59522 | 67.73 | 0.54426 |
| 6 | −114.10029 | 5.000 | | | |
| 7(St) | ∞ | 4.613 | | | |
| *8 | −47.47631 | 1.600 | 1.68893 | 31.08 | 0.59860 |
| *9 | 42.25305 | 0.700 | | | |
| 10 | −1216.23562 | 3.010 | 1.81600 | 46.62 | 0.55682 |
| 11 | −13.11196 | 1.210 | 1.69895 | 30.13 | 0.60298 |
| 12 | 72.82926 | 4.250 | 1.88300 | 40.76 | 0.56679 |
| 13 | −14.88050 | DD[13] | | | |
| *14 | −17.41817 | 1.900 | 1.74950 | 35.33 | 0.58189 |
| *15 | −51.31171 | DD[15] | | | |
| 16 | −24.99882 | 1.260 | 1.54072 | 47.23 | 0.56511 |
| 17 | 59.68030 | 3.421 | 1.88300 | 40.76 | 0.56679 |
| 18 | −54.17958 | 13.194 | | | |
| 19 | ∞ | 2.850 | 1.51680 | 64.20 | 0.53430 |
| 20 | ∞ | 1.000 | | | |

TABLE 14

Example 5

| | INFINITY | β = −0.052 |
|---|---|---|
| DD[13] | 2.664 | 3.448 |
| DD[15] | 5.359 | 4.575 |

TABLE 15

Example 5

| SURFACE NUMBER | 8 | 9 | 14 | 15 |
|---|---|---|---|---|
| KA | 1.0000000E+00 | 1.0000000E+00 | 1.0000000E+00 | 1.0000000E+00 |
| A3 | −2.6358151E−05 | 9.9932268E−06 | 3.0169272E−04 | 3.9921915E−04 |
| A4 | −1.6007327E−04 | 2.6916593E−05 | −2.4560390E−05 | −3.0965443E−04 |
| A5 | 8.2838372E−06 | −7.9207287E−07 | 1.4856131E−04 | 2.3830248E−04 |
| A6 | −1.4704300E−06 | 3.9502490E−07 | −6.6107467E−05 | −2.0997155E−05 |
| A7 | −1.5245859E−07 | 7.6919640E−09 | 2.3432330E−05 | −1.8280457E−05 |
| A8 | 2.6691388E−09 | −2.9265854E−09 | −4.2881216E−06 | 5.3022501E−06 |
| A9 | 1.7367497E−09 | −6.9829293E−10 | −5.4066612E−07 | 3.7550468E−08 |
| A10 | 1.6647920E−10 | −3.2894542E−11 | 3.7924810E−07 | −2.0227810E−07 |
| A11 | −4.8323813E−12 | −1.6774231E−12 | −3.7095156E−08 | 2.0097257E−08 |
| A12 | −3.1933715E−12 | 4.4940648E−13 | −8.3828509E−09 | 2.7059801E−09 |
| A13 | −5.2820090E−13 | 9.8811163E−14 | 1.7694057E−09 | −5.2932595E−10 |
| A14 | −5.0506382E−14 | 1.2968172E−14 | 3.6865470E−11 | −4.3173861E−12 |
| A15 | −1.3478646E−15 | 4.0300104E−16 | −2.9877043E−11 | 5.4613956E−12 |
| A16 | 8.1070575E−16 | −1.5921352E−16 | 1.0018665E−12 | −1.8980798E−13 |
| A17 | 1.8278972E−16 | 7.3347944E−18 | 2.2788069E−13 | −2.3285343E−14 |
| A18 | 2.5215966E−17 | −1.5879360E−18 | −1.3506584E−14 | 1.3803715E−15 |
| A19 | 1.3526914E−18 | −4.6379223E−19 | −6.8067052E−16 | 2.6571022E−17 |
| A20 | −7.4721794E−19 | 3.4489233E−20 | 5.0860833E−17 | −2.3612604E−18 |

Example 6

Figure 6:
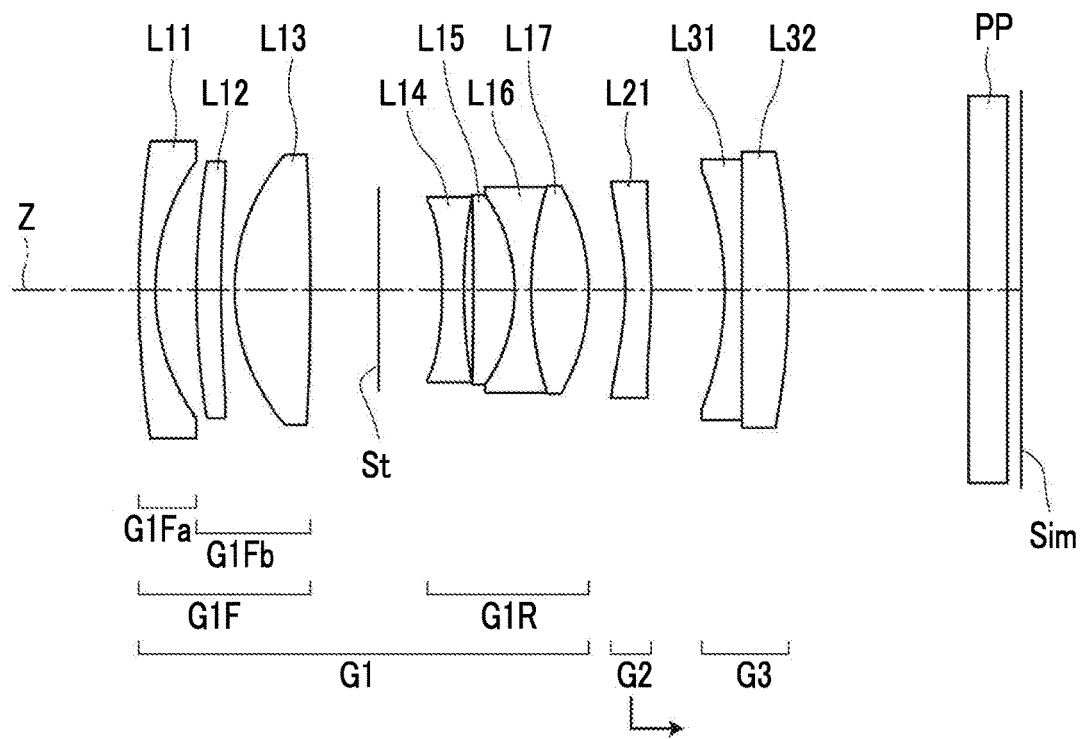
FIG. 6 is a cross-sectional view illustrating a configuration of an imaging lens of Example 6 of the present invention.

FIG. 6 shows a lens configuration of the imaging lens of Example 6. The imaging lens of Example 6 includes, in order from the object side: a first lens group G1 that has a positive refractive power; a second lens group G2 that has a negative refractive power; and a third lens group G3 that has a negative refractive power. The lens groups moving during focusing of an imaging lens of Example 6, a direction of movement of the lens groups, and the number of lenses constituting each lens group are the same as those of Example 1. Table 16 shows basic lens data of the imaging lens of Example 6, Table 17 shows variable surface spacings, and Table 18 shows aspheric coefficients thereof. In FIG. 13, aberration diagrams in a state where an object at infinity is in focus are shown in the upper part thereof, and aberration diagrams in a state where a close-range object having an imaging magnification of −0.060 is in focus are shown in the lower part thereof.

TABLE 16

Example 6
f = 32.825, FNo. = 2.21, 2ω = 47.8°

| Si | Ri | Di | Ndj | vdj | θgFj |
|---|---|---|---|---|---|
| 1 | 72.09298 | 1.200 | 1.72916 | 54.68 | 0.54451 |
| 2 | 16.66039 | 3.000 | | | |
| 3 | 58.53799 | 1.800 | 1.95906 | 17.47 | 0.65993 |
| 4 | 98.28598 | 1.000 | | | |
| 5 | 15.30370 | 5.584 | 1.59522 | 67.73 | 0.54426 |
| 6 | −181.08854 | 5.000 | | | |
| 7(St) | ∞ | 4.613 | | | |
| *8 | −31.72080 | 1.600 | 1.68893 | 31.08 | 0.59860 |
| *9 | 47.93037 | 0.700 | | | |
| 10 | −206.84263 | 3.010 | 1.81600 | 46.62 | 0.55682 |
| 11 | −12.50828 | 1.210 | 1.69895 | 30.13 | 0.60298 |
| 12 | 25.94581 | 4.250 | 1.88300 | 40.76 | 0.56679 |

TABLE 16-continued

Example 6
f = 32.825, FNo. = 2.21, 2ω = 47.8°

| Si | Ri | Di | Ndj | vdj | θgFj |
|---|---|---|---|---|---|
| 13 | −15.41909 | DD[13] | | | |
| *14 | −19.33345 | 1.900 | 1.85400 | 40.38 | 0.56890 |
| *15 | −38.88273 | DD[15] | | | |
| 16 | −24.14504 | 1.260 | 1.62041 | 60.29 | 0.54266 |
| 17 | ∞ | 3.421 | 2.00069 | 25.46 | 0.61364 |
| 18 | −54.22504 | 13.198 | | | |
| 19 | ∞ | 2.850 | 1.51680 | 64.20 | 0.53430 |
| 20 | ∞ | 1.000 | | | |

TABLE 17

Example 6

| | INFINITY | β = −0.060 |
|---|---|---|
| DD[13] | 2.664 | 3.911 |
| DD[15] | 5.359 | 4.112 |

TABLE 18

Example 6

| SURFACE NUMBER | 8 | 9 | 14 | 15 |
|---|---|---|---|---|
| KA | 1.0000000E+00 | 1.0000000E+00 | 1.0000000E+00 | 1.0000000E+00 |
| A3 | 2.0144128E−05 | 5.7979654E−05 | 3.6599063E−05 | 1.1433402E−04 |
| A4 | −1.5551729E−04 | 4.4444943E−05 | −1.3561229E−05 | −2.7443178E−04 |
| A5 | 1.4996655E−05 | −1.8947844E−06 | 1.5507403E−04 | 2.3853446E−04 |
| A6 | −2.6401283E−06 | 9.4758382E−07 | −6.7050662E−05 | −2.0553213E−05 |
| A7 | −1.7482991E−07 | −6.3038027E−08 | 2.3363662E−05 | −1.8410440E−05 |
| A8 | 1.2601894E−08 | −1.4763895E−09 | −4.2760146E−06 | 5.2693723E−06 |
| A9 | 2.0371868E−09 | −2.0953789E−09 | −5.4177365E−07 | 4.5536827E−08 |
| A10 | 2.6285092E−10 | 1.1455002E−10 | 3.7955889E−07 | −2.0246538E−07 |
| A11 | −1.6182848E−11 | −1.9532978E−11 | −3.7110368E−08 | 2.0125925E−08 |
| A12 | −7.2590626E−12 | 3.2944397E−12 | −8.3799837E−09 | 2.7029379E−09 |
| A13 | −7.7929735E−13 | 3.9502238E−13 | 1.7678112E−09 | −5.2903246E−10 |
| A14 | −3.6099796E−14 | 2.7405249E−14 | 3.7189363E−11 | −4.4592137E−12 |
| A15 | 4.9828951E−15 | 1.7449243E−15 | −2.9888180E−11 | 5.4435737E−12 |
| A16 | 1.8226043E−15 | −1.3255013E−15 | 1.0082214E−12 | −1.9121986E−13 |
| A17 | 2.3960876E−16 | 8.3248653E−18 | 2.2513405E−13 | −2.2456072E−14 |
| A18 | 3.1436736E−17 | −1.8410642E−17 | −1.3482190E−14 | 1.3983374E−15 |
| A19 | −6.5594774E−19 | 2.0613372E−18 | −6.2514994E−16 | 1.9713215E−17 |
| A20 | −1.0318799E−18 | 3.1503643E−22 | 4.6986309E−17 | −2.3078668E−18 |

Table 19 shows values corresponding to the conditional expressions (1) to (10) of the imaging lenses of Examples 1 to 6. The values shown in Table 19 are based on the d line.

TABLE 19

| | EXAMPLE 1 | EXAMPLE 2 | EXAMPLE 3 | EXAMPLE 4 | EXAMPLE 5 | EXAMPLE 6 |
|---|---|---|---|---|---|---|
| (1) \|f3/f2\| | 4.881 | 3.135 | 10.481 | 3.000 | 22.000 | 3.500 |
| (2) f1/f | 0.66 | 0.65 | 0.68 | 0.78 | 0.58 | 0.58 |
| (3) NdG2 | 1.803 | 1.694 | 1.806 | 1.713 | 1.750 | 1.854 |
| (4) vdG2 | 40.54 | 53.20 | 40.73 | 53.87 | 35.33 | 40.38 |
| (5) \|f23/f1\| | 3.636 | 3.744 | 3.322 | 5.187 | 2.436 | 1.926 |
| (6) \|f2/f\| | 1.779 | 1.406 | 2.009 | 2.583 | 1.268 | 1.436 |
| (7) \|1 − β2²） × β3²\| | 1.384 | 1.621 | 1.133 | 0.850 | 1.920 | 1.624 |
| (8) β2/β3 | 1.707 | 2.146 | 1.500 | 1.606 | 1.638 | 1.278 |
| (9) \|f3/f\| | 8.686 | 4.673 | 21.066 | 7.748 | 27.916 | 5.026 |
| (10) Ds/TL | 0.333 | 0.293 | 0.348 | 0.298 | 0.302 | 0.276 |

As can be seen from the above-mentioned data, in each of the imaging lenses of Examples 1 to 6, the focus lens group includes only one lens. Thereby, high-speed focusing is possible, fluctuation in aberrations during focusing is suppressed, and each of aberrations is satisfactorily corrected. As a result, high optical performance is achieved.

Figure 14A:
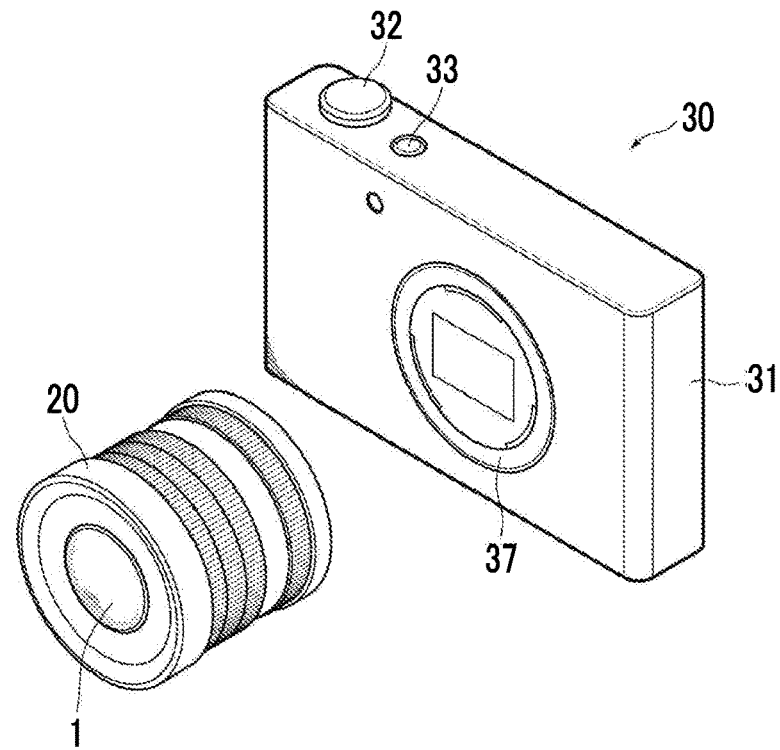
FIG. 14A is a perspective view of the front side of an imaging apparatus according to an embodiment of the present invention.
Figure 14B:
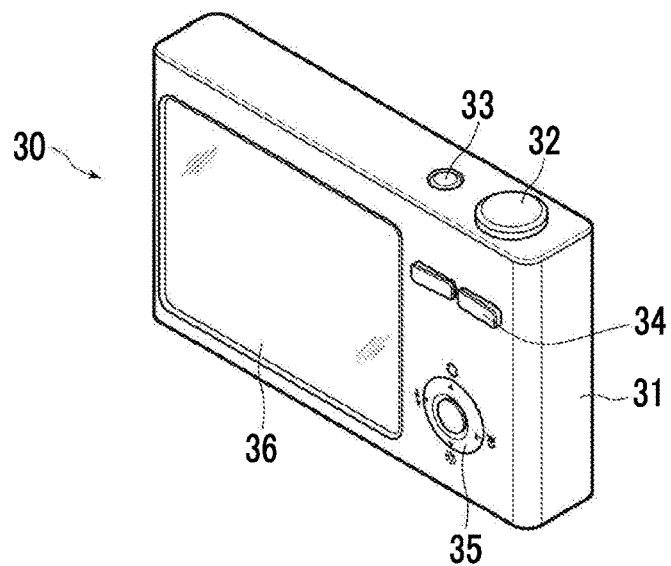
FIG. 14B is a perspective view of the rear side of an imaging apparatus according to the embodiment of the present invention.

Next, an imaging apparatus according to embodiment of the present invention will be described. FIGS. 14A and 14B are external views of a camera 30 which is the imaging apparatus according to the embodiment of the present invention. FIG. 14A is a perspective view of the camera 30 viewed from the front side, and FIG. 14B is a perspective view of the camera 30 viewed from the rear side. The camera 30 is a single-lens digital camera on which an interchangeable lens 20 is detachably mounted and which has no reflex finder. The interchangeable lens 20 is configured such that the imaging lens 1 according to the embodiment of the present invention is housed in a barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a recording medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The recording medium records the generated image. The camera 30 captures a still image or a moving image by pressing the shutter button 32, and records image data, which is obtained through imaging, in the recording medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric surface coefficient of each lens component are not limited to the values shown in the numerical examples, and different values may be used therefor.

Further, the imaging apparatus of the present invention is also not limited to the above-mentioned configurations. For example, the present invention may be applied to a single-lens reflex camera, a film camera, a video camera, and the like.

What is claimed is:

1. An imaging lens consisting of, in order from an object side:
   a first lens group that has a positive refractive power;
   a second lens group that has a negative refractive power; and
   a third lens group that has a positive or negative refractive power,
   wherein the first lens group consists of, in order from the object side, a front group having a positive refractive power, a diaphragm, and a rear group having a positive refractive power,
   wherein the front group has at least one negative lens and at least one positive lens,
   wherein the rear group has at least one negative lens and at least one positive lens,
   wherein the second lens group consists of one negative lens,
   wherein the third lens group has at least one negative lens and at least one positive lens,
   wherein during focusing from an object at infinity to a close-range object, the first lens group and the third lens group remain stationary with respect to an image plane, and the second lens group moves from the object side to an image side,
   wherein the following conditional expression (1) is satisfied, $$2.5 < |f3/f2| \qquad (1),$$

where f3 is a focal length of the third lens group,
   f2 is a focal length of the second lens group, and
   wherein the following conditional expression (7) is satisfied, $$0.6 < |(1-\beta2^2) \times \beta3^2| < 2.3 \qquad (7),$$

where β2 is a lateral magnification of the second lens group in a state where the object at infinity is in focus, and
   β3 is a lateral magnification of the third lens group in a state where the object at infinity is in focus.

2. The imaging lens according to claim 1, wherein the following conditional expression (2) is satisfied, $$0.4 < f1/f < 1.2 \qquad (2),$$

where f1 is a focal length of the first lens group, and
   f is a focal length of the whole system in a state where the object at infinity is in focus.

3. The imaging lens according to claim 1, wherein the following conditional expressions (3) and (4) are satisfied, $$1.68 < NdG2 \qquad (3), \text{ and}$$

$$30 < vdG2 < 60 \qquad (4),$$

where NdG2 is a refractive index of the negative lens of the second lens group at a d line, and
   vdG2 is an Abbe number of the negative lens of the second lens group at the d line.

4. The imaging lens according to claim 1, wherein the following conditional expression (6) is satisfied, $$0.8 < |f2/f| < 3.0 \qquad (6),$$

where f is a focal length of the whole system in a state where the object at infinity is in focus.

5. The imaging lens according to claim 1, wherein the following conditional expression (8) is satisfied, $$1.0 < \beta2/\beta3 < 2.6 \qquad (8),$$

where β2 is a lateral magnification of the second lens group in a state where the object at infinity is in focus, and
   β3 is a lateral magnification of the third lens group in a state where the object at infinity is in focus.

6. The imaging lens according to claim 1, wherein the following conditional expression (9) is satisfied, $$3.0 < |f3/f| \qquad (9),$$

where f is a focal length of the whole system in a state where the object at infinity is in focus.

7. The imaging lens according to claim 1, wherein the following conditional expression (10) is satisfied, $$0.2 < Ds/TL < 0.5 \qquad (10),$$

where Ds is a distance from a lens surface closest to the object side to the diaphragm on the optical axis, and
   TL is a sum of a back focus as an air conversion distance and a distance on the optical axis from the lens surface closest to the object side to a lens surface closest to the image side.

8. The imaging lens according to claim 1, wherein the third lens group consists of one negative lens and one positive lens.

9. The imaging lens according to claim 1, wherein the front group consists of a negative lens, which is disposed to be closest to the object side, and a partial lens group which is disposed to be separated by an air gap from the negative lens and has a positive refractive power.

10. The imaging lens according to claim 1, wherein the rear group has at least two negative lenses and at least two positive lenses.

11. The imaging lens according to claim 1,
    wherein the rear group has, in order from the object side, one negative lens and three cemented lenses, and
    wherein the three cemented lenses are formed by cementing two positive lenses and one negative lens.

12. The imaging lens according to claim 1,
    wherein the rear group consists of, in order from the object side, one negative lens and three cemented lenses, and
    wherein the three cemented lenses are formed by cementing a positive lens, a negative lens, and a positive lens, in order from the object side.

13. The imaging lens according to claim 1, wherein the third lens group has a positive refractive power.

14. The imaging lens according to claim 1, wherein the third lens group consists of, in order from the object side, one negative lens and one positive lens.

15. The imaging lens according to claim 1, wherein the front group consists of a negative lens, which is disposed to be closest to the object side, and a cemented lens which is disposed to be separated by an air gap from the negative lens and is formed by cementing one positive lens and one negative lens.

16. An imaging apparatus comprising the imaging lens according to claim 1.

17. An imaging lens consisting of, in order from an object side:

a first lens group that has a positive refractive power;

a second lens group that has a negative refractive power; and a third lens group that has a positive or negative refractive power, wherein the first lens group consists of, in order from the object side, a front group having a positive refractive power, a diaphragm, and a rear group having a positive refractive power, wherein the front group has at least one negative lens and at least one positive lens, wherein the rear group has at least one negative lens and at least one positive lens, wherein the second lens group consists of one negative lens, wherein the third lens group has at least one negative lens and at least one positive lens, wherein during focusing from an object at infinity to a close-range object, the first lens group and the third lens group remain stationary with respect to an image plane, and the second lens group moves from the object side to an image side, wherein the following conditional expression (1) is satisfied, $$2.5 < |f3/f2| \qquad (1),$$

where f3 is a focal length of the third lens group, f2 is a focal length of the second lens group, and wherein a negative lens is disposed to be closest to the object side of the front group.

18. An imaging apparatus comprising the imaging lens according to claim 17.

19. An imaging lens consisting of, in order from an object side:

a first lens group that has a positive refractive power;

a second lens group that has a negative refractive power; and a third lens group that has a positive or negative refractive power, wherein the first lens group consists of, in order from the object side, a front group having a positive refractive power, a diaphragm, and a rear group having a positive refractive power, wherein the front group has at least one negative lens and at least one positive lens, wherein the rear group has at least one negative lens and at least one positive lens, wherein the second lens group consists of one negative lens, wherein the third lens group has at least one negative lens and at least one positive lens, wherein during focusing from an object at infinity to a close-range object, the first lens group and the third lens group remain stationary with respect to an image plane, and the second lens group moves from the object side to an image side, wherein the following conditional expression (1) is satisfied, $$2.5 < |f3/f2| \qquad (1),$$

where f3 is a focal length of the third lens group, f2 is a focal length of the second lens group, and wherein the following conditional expression (5) is satisfied, $$1.5 < |f23/f1| < 5.4 \qquad (5),$$

where f23 is a combined focal length of the second lens group and the third lens group in a state where the object at infinity is in focus, and f1 is a focal length of the first lens group.

20. An imaging apparatus comprising the imaging lens according to claim 19.

* * * * *